US009598066B2

(12) United States Patent
Kawai et al.

(10) Patent No.: US 9,598,066 B2
(45) Date of Patent: Mar. 21, 2017

(54) CONTROL APPARATUS FOR VEHICLE MOTOR

(71) Applicant: TOYOTA JIDOSHA KABUSHIKI KAISHA, Toyota-shi, Aichi-ken (JP)

(72) Inventors: Takashi Kawai, Gotemba (JP); Takuro Kumada, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 23 days.

(21) Appl. No.: 14/768,319

(22) PCT Filed: Feb. 19, 2013

(86) PCT No.: PCT/JP2013/053991
§ 371 (c)(1),
(2) Date: Aug. 17, 2015

(87) PCT Pub. No.: WO2014/128829
PCT Pub. Date: Aug. 28, 2014

(65) Prior Publication Data
US 2016/0001761 A1 Jan. 7, 2016

(51) Int. Cl.
*B60W 10/08* (2006.01)
*B60K 6/26* (2007.10)
(Continued)

(52) U.S. Cl.
CPC ............ *B60W 10/08* (2013.01); *B60K 6/26* (2013.01); *B60L 3/0061* (2013.01); *B60L 3/04* (2013.01);
(Continued)

(58) Field of Classification Search
None
See application file for complete search history.

(56) References Cited

U.S. PATENT DOCUMENTS 7,460,030 B2 * 12/2008 Farkas ............... G01R 31/3183
341/11
8,908,336 B2 * 12/2014 Cullen ................... H02P 25/22
318/400.01
(Continued)

FOREIGN PATENT DOCUMENTS

JP H01-113502 U 7/1989
JP 06-032722 A 8/1994
(Continued)

OTHER PUBLICATIONS

English-language machine translation of Japanese patent reference JPH06-032722, which corresponds to JPH01-113502, a Japanese-language reference submitted on Sep. 14, 2015.

*Primary Examiner* — Rami Khatib
(74) *Attorney, Agent, or Firm* — Andrews Kurth Kenyon LLP

(57) ABSTRACT

A control apparatus for a vehicle motor is a control apparatus for a vehicle motor configured to control a motor that can realize a plurality of characteristics in which output upper limits of torque are different from each other. The control apparatus for the vehicle motor is provided with: a characteristic switching device configured to switch a characteristic of the motor between a first characteristic in which the output upper limit is first predetermined torque and a second characteristic in which the output upper limit is second predetermined torque, which is lower than the first predetermined torque; a characteristic switching abnormality determining device configured to determine whether or not there is an abnormality in switching of the characteristic of the motor; and a fail-safe performing device configured to perform a fail-safe process according to the characteristic of the motor if it is determined that there is the abnormality in the switching of the characteristic of the motor.

7 Claims, 21 Drawing Sheets

(51) Int. Cl.
*B60W 20/00* (2016.01)
*B60L 3/00* (2006.01)
*B60L 3/04* (2006.01)
*B60L 7/14* (2006.01)
*B60L 11/12* (2006.01)
*B60L 11/14* (2006.01)
*B60L 15/20* (2006.01)
*B60W 10/06* (2006.01)

(52) U.S. Cl.
CPC ............... *B60L 7/14* (2013.01); *B60L 11/123* (2013.01); *B60L 11/14* (2013.01); *B60L 15/2009* (2013.01); *B60W 10/06* (2013.01); *B60W 20/15* (2016.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2250/10* (2013.01); *B60L 2270/145* (2013.01); *B60W 2510/0638* (2013.01); *B60W 2710/0644* (2013.01); *Y02T 10/6217* (2013.01); *Y02T 10/645* (2013.01); *Y02T 10/648* (2013.01); *Y02T 10/7077* (2013.01); *Y02T 10/7241* (2013.01); *Y02T 10/7275* (2013.01); *Y10S 903/906* (2013.01)

(56) References Cited

U.S. PATENT DOCUMENTS

| 2005/0156550 | A1 | 7/2005 | Kamio et al. |
| 2009/0302792 | A1 | 12/2009 | Osada et al. |
| 2013/0174556 | A1* | 7/2013 | Nishikawa .............. E02F 9/123 60/718 |

FOREIGN PATENT DOCUMENTS

| JP | 2003-244874 A | 8/2003 |
| JP | 2005-185068 A | 7/2005 |
| JP | 2007-244060 A | 9/2007 |
| JP | 2009-303298 A | 12/2009 |
| JP | 2011-030341 A | 2/2011 |
| JP | 2011-050150 A | 3/2011 |

\* cited by examiner

CONTROL APPARATUS FOR VEHICLE MOTOR

CROSS-REFERENCE TO RELATED APPLICATION

This is a national phase application based on the PCT International Patent Application No. PCT/JP2013/053991 filed Feb. 19, 2013, the entire contents of which are incorporated herein by reference.

TECHNICAL FIELD

The present invention relates to a control apparatus for a vehicle motor, configured to control operation of a motor mounted on a vehicle such as, for example, an automobile.

BACKGROUND ART

As this type of motor, there is known a motor configured to switch between a plurality of characteristics to be driven. For example, Patent Literatures 1 and 2 disclose a proposed technology in which varying a relative phase of two rotors divided in a rotating shaft direction makes it possible to change between characteristics. Moreover, Patent Literature 3 discloses a proposed technology in which varying a relative phase of two rotors divided in a circumferential direction makes it possible to change between the characteristics. Furthermore, Patent Literature 4 discloses a proposed technology in which selectively switching between two types of winding wires to be used makes it possible to change between the characteristics.

CITATION LIST

Patent Literature

Patent Literature 1: Japanese Patent Application Laid Open No. 2011-030341
Patent Literature 2: Japanese Patent Application Laid Open No. 2003-244874
Patent Literature 3: Japanese Patent Application Laid Open No. 2007-244060
Patent Literature 4: Japanese Patent Application Laid Open No. 2011-050150

SUMMARY OF INVENTION

Technical Problem

As described above, if the motor can be driven by switching between the plurality of characteristics, it is possible to realize a highly efficient operating state according to circumstances. Specifically, electric power consumed by driving can be effectively suppressed by switching between the characteristics in situations in which relatively high torque is required (e.g. at the start of a vehicle) and in situations in which only relatively low torque is required (e.g. during high-speed running).

There is, however, a possibility that the aforementioned characteristic switching control cannot be performed due to unexpected failures or the like. In other words, there can be such situations that the characteristic of the motor is fixed to one characteristic.

Here, in particular, in the vehicle motor, due to the nature thereof, it is required at the minimum to maintain a state in which the vehicle can run even if a defect occurs. However, for example, if the switching control cannot be performed in a state in which it is switched to such a characteristic that allows output torque to be limited, insufficient torque causes unexpected vehicle behavior, which possibly not only hinders appropriate running but also makes it hard to ensure safety.

As described above, the technologies described in the Patent Literatures 1 to 4 have such a technical problem that the fixed characteristic possibly causes a further disadvantage if the characteristic switching control cannot be performed.

It is therefore an object of the present invention to provide a control apparatus for a vehicle motor, in which appropriate running can be realized even if the characteristic switching control cannot be performed.

Solution to Problem

The above object of the present invention can be achieved by a control apparatus for a vehicle motor, configured to control a motor that can realize a plurality of characteristics in which output upper limits of torque are different from each other, said control apparatus for the vehicle motor comprising: a characteristic switching device configured to switch a characteristic of the motor between a first characteristic in which the output upper limit is first predetermined torque and a second characteristic in which the output upper limit is second predetermined torque, which is lower than the first predetermined torque; a characteristic switching abnormality determining device configured to determine whether or not there is an abnormality in switching of the characteristic of the motor; and a fail-safe performing device configured to perform a fail-safe process according to the characteristic of the motor if it is determined that there is the abnormality in the switching of the characteristic of the motor.

The motor according to the present invention is configured as an electric motor generator such as, for example, a motor generator, and is mounted on a vehicle such as a hybrid vehicle and an electric vehicle, and functions as a power source of the vehicle. In particular, the motor according to the present invention can realize the plurality of characteristics in which the output upper limits of torque are different from each other. As one example of the characteristics, for example, magnetic field characteristics of the motor are exemplified. In a motor having rotors divided in a circumferential direction or in a shaft direction, changing a relative phase of the rotors makes it possible to realize the characteristic switching. Alternatively, in a motor having a rotor(s) provided with a plurality of winding wires, switching between the winding wires to be used also makes it possible to switch between the characteristics. As a method of switching between the characteristics of the motor, another known method can be also used.

The control apparatus for the vehicle motor according to the present invention is an apparatus configured to perform control of the aforementioned motor, and can adopt forms of various computer systems such as various processing units like a single or a plurality of electronic control units (ECUs), various controllers, or microcomputer apparatuses, which can include, as occasion demands, one or a plurality of central processing units (CPUs), micro processing units (MPUs), various processors, or various controllers, or which can further include various storage devices such as a read only memory (ROM), a random access memory (RAM), a buffer memory, or a flash memory, and the like.

In operation of the control apparatus for the vehicle motor according to the present invention, the characteristic of the motor is switched between the plurality of characteristics by the characteristic switching device. Specifically, the characteristic switching device switches the characteristic of the motor between the first characteristic in which the output upper limit is the first predetermined torque and the second characteristic in which the output upper limit is the second predetermined torque. Here, the second predetermined torque has a value that is lower than that of the first predetermined torque. Thus, it can be said that the second characteristic in which the second predetermined torque is the output upper limit is a characteristic in which the torque that can be outputted is lower than that of the first characteristic in which the first predetermined torque is the output upper limit (i.e. a characteristic in which the output torque is limited).

By switching between the characteristics in which the output upper limits of the torque are different from each other as described above, efficient operation of the motor can be realized. For example, at the start of the vehicle or in similar cases, it is required to output relatively high torque. Therefore, preferable running of the vehicle can be realized by switching the characteristic of the motor to the first characteristic having the higher output upper limit of the torque. On the other hand, during high-speed running of the vehicle, a high number of revolutions is required, while the torque is not required so much. Therefore, the efficient operation with less power consumption can be realized by switching the characteristic of the motor to the second characteristic having the lower output upper limit.

The switching of the characteristic of the motor (hereinafter referred to as "characteristic switching control" as occasion demands) by the characteristic switching device described above is performed, as occasion demands, for example, according to a running situation of the vehicle (e.g. a vehicle speed, an accelerator opening degree, etc.). At that time, particularly in the present invention, it is determined by the characteristic switching abnormality determining device whether or not there is an abnormality in the characteristic switching control. The "abnormality" herein means a situation in which the characteristic cannot be switched to an expected characteristic by the characteristic switching control, and is a concept not only including a physical abnormality in which the characteristic switching cannot be performed, for example, due to mechanical failures of a mechanism for switching between the characteristic or the like, but also including a logical abnormality in which a target characteristic to which it is to be switched by the switching control and an actual characteristic are different from each other.

Here, if there is the abnormality in the characteristic switching control, the characteristic to be realized on the motor is not realized, and there is thus a possibility that an effect of improving operation efficiency, which is obtained by switching between the characteristics, or similar effects cannot be obtained. This reduces, for example, a cruisable distance of the vehicle, and adversely influences the subsequent running. Moreover, if the characteristic of the motor is fixed to the first characteristic having the higher output upper limit, unexpected charge possibly occurs in a battery that is charged with electric power regenerated by the motor. On the other hand, if the characteristic of the motor is fixed to the second characteristic having the lower output upper limit, the torque to be outputted to appropriately run the vehicle cannot be outputted, which possibly results in unstable vehicle behavior.

Thus, particularly in the present invention, if it is determined that there is the abnormality in the characteristic switching control, the fail-safe process according to the characteristic of the motor is performed by the fail-safe performing device. For example, if the characteristic of the motor is fixed to the first characteristic due to the abnormality in the characteristic switching control, the fail-safe process according to the first characteristic such as prevention of overcharge of the battery is performed. Moreover, if the characteristic of the motor is fixed to the second characteristic, the fail-safe process according to the second characteristic such as prevention of insufficient output torque is performed. If the characteristic of the motor is unknown, restriction of the control of the motor, a restoring process to the normal characteristic, or the like may be performed.

The "fail-safe process" herein may be any process that can reduce a disadvantage caused by the occurrence of the abnormality in the characteristic switching control to a greater or lesser degree, and may not be necessarily a process that completely eliminates the disadvantage caused by the abnormality in the characteristic switching control, or a process that completely solves the abnormality. The fail-safe process may also include a plurality of processes that are performed in a plurality of parts of the vehicle. The fail-safe process specifically includes a process of limiting various controls in the motor (e.g. driving force control and characteristic switching control), or the like. Moreover, in a hybrid vehicle provided with an internal combustion engine in addition to the motor, or the like, the fail-safe process may include a process of controlling the internal combustion engine in order to ensure the power source other than the motor, or the like. The fail-safe process may also include a process other than the control that is directly related to the running of the vehicle (e.g. call for a driver's attention, etc.)

As explained above, according to the control apparatus for the vehicle motor according to the present invention, even if there is the abnormality in the characteristic switching control of the motor, it is possible to run the vehicle while reducing the disadvantage caused by the abnormality.

In one aspect of the control apparatus for the vehicle motor according to the present invention, wherein said characteristic switching abnormality determining device comprises (i) a logical contradiction determining device configured to determine that there is a logical contradiction in the characteristic of the motor if a characteristic to which it is to be switched by the switching of the characteristic of the motor performed immediately before and a present characteristic of the motor are different from each other and (ii) an unswitchability determining device configured to determine that the characteristic of the motor is unswitchable if the switching of the characteristic of the motor cannot be performed, and said fail-safe mode performing device sets switching frequency of the characteristic of the motor in the fail-safe process based on the logical contradiction to be higher than switching frequency of the characteristic of the motor in the fail-safe process based on the unswitchability.

According to this aspect, the characteristic switching abnormality determining device can determine that there is the logical contradiction in which the characteristic to which it is to be switched by the characteristic switching control performed immediately before (i.e. the characteristic to be currently realized) and the present characteristic of the motor actually realized are different from each other, by using the logical contradiction determining device. The occurrence of the logical contradiction can be determined, for example, by comparing the characteristic stored in a storing device, which is configured to store the characteristic of the motor after the characteristic switching control, with the characteristic detected in real time.

In addition, the characteristic switching abnormality determining device can determine that the characteristic of the motor is unswitchable by using the unswitchability determining device. The unswitchability can occur, for example, due to mechanical failures of the mechanism for switching between the characteristics, or the like. The unswitchability can be determined, for example, by whether or not there is a change in the characteristics before and after actual implementation of the characteristic switching control.

Here, the aforementioned logical contradiction is a state in which the characteristic to be realized and the actual characteristic are merely different from each other, and there is still a possibility that the characteristic switching control itself is normally performed. Thus, even if there is the logical contradiction, there is a possibility that the expected characteristic can be realized in the next characteristic switching control. On the other hand, in the case of the unswitchability, it is found out that the switching control cannot be performed. There is thus a low possibility that the expected characteristic is realized in the next characteristic switching control.

Therefore, in this aspect, the characteristic switching frequency in the fail-safe process based on the logical contradiction (i.e. the fail-safe process performed while the occurrence of the logical contradiction is considered to be the abnormality in the characteristic switching) is set to be higher than the characteristic switching frequency in the fail-safe process based on the unswitchability (i.e. the fail-safe process performed while the determination of the unswitchability is considered to be the abnormality in the characteristic switching). In this manner, if there is the logical contradiction having a relatively high possibility of restoration of the characteristic switching in a normal state, the characteristic switching control is more frequently performed. Thus, the possibility that the characteristic switching is restored in the normal state can be increased. Moreover, if there is the unswitchability having a relatively low possibility of restoration of the characteristic switching in the normal state, the characteristic switching control is less frequently performed. It is thus possible to suppress the control that has a low restoration possibility and that is wasted, thereby efficiently reducing power consumption.

In another aspect of the control apparatus for the vehicle motor according to the present invention, wherein the motor is configured to control a number of revolutions of an internal combustion engine of a vehicle on which the motor is mounted, and said fail-safe performing device can perform driving force restriction of the motor as the fail-safe process if the characteristic of the motor when it is determined that there is the abnormality is the second characteristic, and the driving force restriction is more significant during stop of the internal combustion engine than during driving of the internal combustion engine.

The motor according to this aspect is provided for a hybrid vehicle having the internal combustion engine in addition to the motor, as the power source. In particular, the motor according to this aspect is configured to control the number of revolutions of the internal combustion engine of the vehicle. More specifically, the motor according to this aspect is configured, for example, to output torque to a crankshaft of the internal combustion engine, and can perform start control of the internal combustion engine that is stopped, by outputting predetermined cranking torque.

In this aspect, if the characteristic of the motor when it is determined that there is the abnormality in the characteristic switching control is the second characteristic (i.e. the characteristic having the relatively lower output upper limit), the driving force restriction of the motor is performed as the fail-safe process by the fail-safe performing device. This can reduce the occurrence of an insufficient driving force caused by the low output upper limit. The fail-safe performing device may be also able to perform the driving force restriction of the motor as the fail-safe process even if the characteristic of the motor is not the second characteristic. The fail-safe performing device may be also able to perform a process other than the driving force restriction of the motor as the fail-safe process.

Particularly in this aspect, the aforementioned driving force restriction is more significant during stop of the internal combustion engine than during driving of the internal combustion engine. Therefore, during stop of the internal combustion engine, a driving force required by the motor is smaller than during driving of the internal combustion engine.

Here, if the characteristic of the motor is the second characteristic having the lower output upper limit, even if it is tried to start the internal combustion engine that is stopped, sufficient cranking torque cannot be outputted, and vibration caused by a starting failure possibly occurs. Moreover, even if the start of the internal combustion engine is succeeded, the vibration possibly deteriorates because the motor cannot receive reaction of the internal combustion engine after the start.

In this aspect, however, the driving force restriction is more significant during stop of the internal combustion engine, as described above. Thus, there are more opportunities in which the required driving force can be covered only by the driving force of the motor, and there are few opportunities in which the driving force is required by the internal combustion engine. Therefore, the frequency of starting the internal combustion engine is reduced, which can result in a reduction in the frequency of the deterioration of the vibration caused by the starting failure.

Moreover, even if it is required to start the internal combustion engine and the start of the internal combustion engine is succeeded, the driving force is significantly restricted. Thus, only relatively low output is required by the internal combustion engine. The reaction of the internal combustion engine is thus also low. Even if the output torque of the motor is limited, the deterioration of the vibration can be suppressed.

As described above, if the driving force restriction during stop of the internal combustion engine is more significant than during driving of the internal combustion engine, it is possible to more preferably avoid a disadvantage caused by the stop of the internal combustion engine. Moreover, during stop of the internal combustion engine, consumption energy of the entire vehicle is suppressed due to the significant driving force restriction, and a cruising distance thus increases as well.

The driving force restriction during stop of the internal combustion engine may be not always more significant than the driving force restriction during driving of the internal combustion engine. In other words, even during stop of the internal combustion engine, the same degree of driving force as that during driving of the internal combustion engine may be temporarily required. For example, during hill climbing of the vehicle in which relatively high driving force is required, or in similar cases, the driving force is not significantly restricted even during stop of the internal combustion engine, and the same degree of driving force as that during driving of the internal combustion engine can be outputted. Such a configuration makes it possible to avoid a disadvantage in the running of the vehicle, which is caused by the restriction of the driving force to suppress the deterioration of the vibration.

In an aspect in which the number of revolutions of the motor is provided to correspond to the number of revolutions of the internal combustion engine, wherein said fail-safe performing device prohibits intermittent stop of the internal combustion engine as the fail-safe process if the characteristic of the motor when it is determined that there is the abnormality is the second characteristic and if the internal combustion engine is being driven.

By virtue of such a configuration, if the characteristic of the motor when there is the abnormality is the second characteristic, the internal combustion engine keeps being driven by the fail-safe process, and thus, torque for starting the internal combustion engine does not have to be outputted from the motor. Therefore, even if the characteristic of the motor is fixed to the second characteristic, it is possible to prevent a situation in which the internal combustion engine cannot be started due to the insufficient driving force.

In another aspect of the control apparatus for the vehicle motor according to the present invention, wherein said fail-safe performing device can output a demand to switch the characteristic of the motor as the fail-safe process, and the demand to switch the characteristic of the motor is more frequently outputted after a start of a vehicle on which the motor is mounted, than at the start of the vehicle.

According to this aspect, the demand to switch the characteristic of the motor can be outputted as the fail-safe process. It is thus possible to restore the characteristic switching control in the normal state, for example, if the characteristic to be realized and the actual characteristic are different or in similar cases.

Particularly in this aspect, the aforementioned characteristic switching demand is outputted more frequently after the start of the vehicle than at the start of the vehicle. "At the start of the vehicle" herein is a concept including immediately after the vehicle that is stopped in operation is set in an operating state and a subsequent predetermined period, and is not limited to a moment at which the vehicle is started. On the other hand, "after the start of the vehicle" means a period after the "start of the vehicle".

According to the study of the present inventors, it is found that if the vehicle is stopped for a long time, the characteristic switching device is highly likely unswitchable at the start immediately after the stop for the long time, in comparison with a case of the stop for a short time. Thus, even if the characteristic switching demand is outputted at the start of the vehicle, there is a high possibility that the characteristic switching control cannot be normally performed due to the unswitchability. Therefore, if the output frequency of the characteristic switching demand is set to be low at the start of the vehicle, it is possible to suppress wasteful power consumption caused by the implementation of the characteristic switching control.

In another aspect of the control apparatus for the vehicle motor according to the present invention, wherein said fail-safe performing device performs boost control of a power storing device in which electric power regenerated by the motor is stored, as the fail-safe process, if the characteristic of the motor when it is determined that there is the abnormality is the first characteristic and after a vehicle on which the motor is mounted is started.

According to this aspect, regardless of the control of switching the characteristic of the motor to the second characteristic, if the characteristic of the motor is fixed to the first characteristic, the boost control of the power storing device (e.g. a battery) is performed as the fail-safe process. A target voltage value of the boost control can be calculated on the basis of a corresponding back electromotive force constant of the first characteristic (i.e. a coefficient for converting the number of revolutions of the motor to induced voltage) and the present number of revolutions of the motor. If the boost control of the power storing device is performed in this manner, it is possible to prevent unexpected charge of the power storing device caused by back electromotive force, thereby suppressing a defect of the power storing device caused by the overcharge or the like.

In another aspect of the control apparatus for the vehicle motor according to the present invention, wherein said fail-safe performing device performs boost control of a power storing device in which electric power regenerated by the motor is stored before the switching, if it is determined there is no abnormality and if the characteristic of the motor is switched from the second characteristic to the first characteristic.

According to this aspect, if the characteristic of the motor is switched from the second characteristic to the first characteristic (i.e. if the characteristic is switched to the characteristic having the higher output upper limit), the boost control of the power storing device is performed before the switching. This control is performed not as the fail-safe process when there is the abnormality in the characteristic switching control, but as a process when there is no abnormality in the characteristic switching control.

Here, if the boost control of the power storing device is performed after the characteristic of the motor is switched to the first characteristic, there is a possibility that the power storing device is unexpectedly charged between the start and the completion of the switching control. In this aspect, however, as described above, the boost control of the power storing device is performed before the start of the switching control. It is therefore possible to more effectively suppress the defect of the power storing device caused by the overcharge during the characteristic switching control or the like.

In another aspect of the control apparatus for the vehicle motor according to the present invention, wherein said control apparatus for the vehicle motor comprises: a characteristic controlling device configured to control said characteristic switching device to switch the characteristic of the motor to the first characteristic if a vehicle on which the motor is mounted is stopped; and a flagging device configured to set a flag indicating a failure of the switching of the characteristic of the motor if the characteristic of the motor is not switched to the first characteristic according to the control by said characteristic controlling device, and said characteristic switching abnormality determining device determines that there is the abnormality in the switching of the characteristic of the motor if the flag is set at a restart of the vehicle.

According to this aspect, if the vehicle on which the motor is mounted is stopped, the characteristic switching device is controlled by the characteristic controlling device to switch the characteristic of the motor to the first characteristic. If the characteristic of the motor is determined to be already the first characteristic, the characteristic of the motor may not be switched. As a result of such control, the characteristic of the motor when the vehicle is stopped is set to be the first characteristic, regardless of the characteristic immediately before the stop.

As described above, if the characteristic of the motor upon stop of the vehicle is set to the first characteristic, the motor can output relatively high torque even if the characteristic switching control cannot be normally performed during stop of the vehicle. Thus, it is possible to avoid a disadvantage caused by the insufficient output torque from the motor at the restart.

From the viewpoint of avoiding the disadvantage described above, the first predetermined torque, which is the output upper limit of the first characteristic, has preferably a high value. However, as long as the first predetermined torque, which is the output upper limit of the first characteristic, is greater than the second predetermined torque, which is the output upper limit of the second characteristic, even to a greater or lesser degree, the aforementioned effect is properly demonstrated regardless of the magnitude of the first predetermined torque.

In particular, there is also a possibility that the switching to the first characteristic during stop of the vehicle is not normally performed due to the occurring abnormality in the characteristic switching control. In this case, the flag indicating the failure of the characteristic switching control is set by the flagging device. Then, on the characteristic switching abnormality determining device, it is determined that there is the abnormality in the characteristic switching control if the flag is set at the restart of the vehicle.

If the abnormality in the characteristic switching control is determined in the above manner, the occurrence of the abnormality can be easily determined only by determining whether or not the flag is set, without newly performing the control for determining the abnormality at the restart of the vehicle. Therefore, the transition to the fail-safe process can be more preferably made.

The operation and other advantages of the present invention will become more apparent from embodiments explained below.

DESCRIPTION OF EMBODIMENTS

Hereinafter, embodiments of the present invention will be explained with reference to the drawings.
<Configuration of Vehicle>

Figure 1:
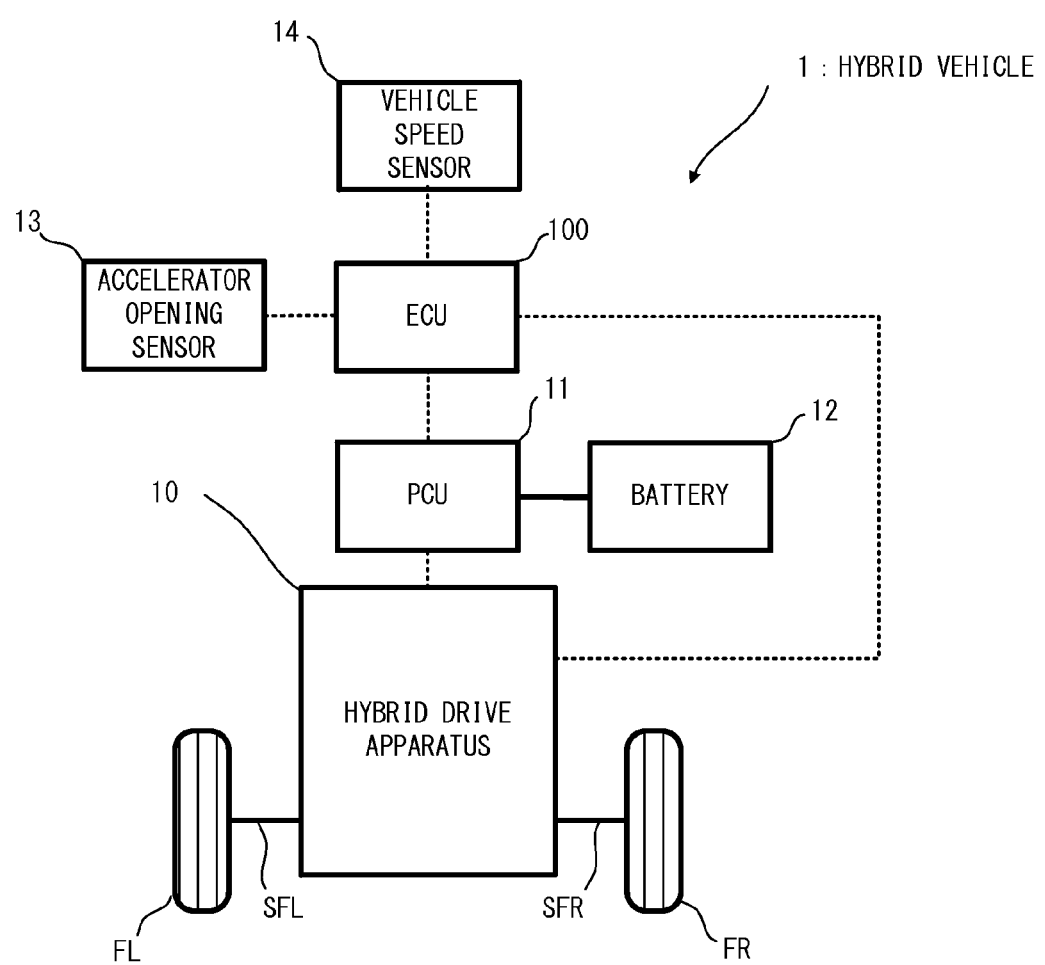
FIG. 1 is a schematic diagram illustrating an entire configuration of a vehicle on which a control apparatus for a vehicle motor according to an embodiment is mounted.

Firstly, an entire configuration of a vehicle on which a control apparatus for a vehicle motor according to an embodiment is mounted will be explained with reference to FIG. 1. FIG. 1 is a schematic diagram illustrating the entire configuration of the vehicle on which the control apparatus for the vehicle motor according to the embodiment is mounted.

In FIG. 1, a vehicle 1 according to the embodiment is a so-called hybrid vehicle, which is provided with a hybrid drive apparatus 10, a power control unit (PCU) 11, a battery 12, an accelerator opening sensor 13, a vehicle speed sensor 14, and an ECU 100.

The ECU 100 is an electronic control unit, which is provided with a central processing unit (CPU), a read only memory (ROM), a random access memory (RAM), and the like, and which is configured to control operation of each unit of the hybrid vehicle 1. The ECU 100 is configured to perform various controls in the hybrid vehicle 1, in accordance with a control program stored, for example, in the ROM or the like. The ECU 100 also functions as one example of the "control apparatus for the vehicle motor" according to the present invention.

The PCU 11 converts direct current (DC) power extracted from the battery 12 to alternating current (AC) power, and supplies it to each of a motor generator MG1 and a motor generator MG2 described later. Moreover, the PCU 11 includes a not-illustrated inverter(s) configured to convert AC power generated by the motor generator MG1 and the motor generator MG2 to DC power, and to supply it to the battery 12. In other words, the PCU 11 is a power control unit configured to control input/output of electric power between the battery 12 and each motor generator, or input/output of electric power between the motor generators (i.e. in this case, electric power is transmitted and received between the motor generators without through the battery 12). The PCU 11 is electrically connected to the ECU 100, and operation thereof is controlled by the ECU 100.

The battery 12 is one example of the "power storing device" according to the present invention, and function as an electric power supply associated with electric power for power running of the motor generator MG1 and the motor generator MG2. The battery 12 is chargeable, and a power storage amount or state of charge (SOC) thereof can be detected on the ECU 100 or the like.

The accelerator opening sensor 13 is a sensor configured to detect an accelerator opening degree, which is a manipulated variable or operation amount of a not-illustrated accelerator pedal of the hybrid vehicle 1. The accelerator opening sensor 13 is electrically connected to the ECU 100, and the detected accelerator opening degree is referred to by the ECU 100 with a regular or irregular period.

The vehicle speed sensor 14 is a sensor configured to detect a vehicle speed of the hybrid vehicle 1. The vehicle speed sensor 14 is electrically connected to the ECU 100, and the detected vehicle speed is referred to by the ECU 100 with a regular or irregular period.

Figure 2:
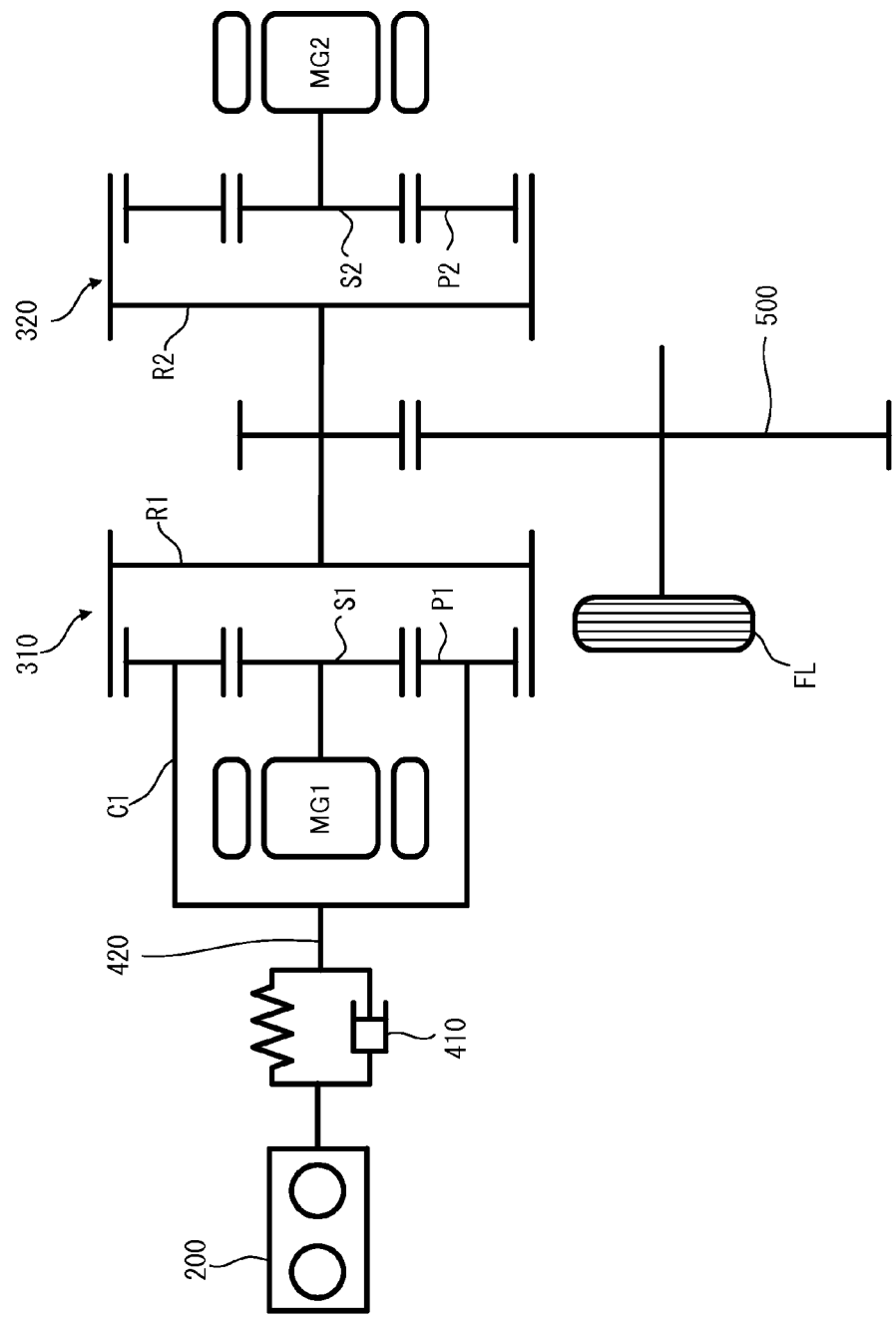
FIG. 2 is a schematic block diagram conceptually illustrating a configuration of a hybrid drive apparatus.

The hybrid drive apparatus 10 is a power unit that functions as a power train of the hybrid vehicle 1. Now, with reference to FIG. 2, a detailed configuration of the hybrid drive apparatus 10 will be explained. FIG. 2 is a schematic block diagram conceptually illustrating the configuration of the hybrid drive apparatus according to the embodiment.

In FIG. 2, the hybrid drive apparatus 10 is provided mainly with an engine 200, a MG1-side power transmission mechanism 310, a MG2-side power transmission mechanism 320, a damper 410, the motor generator MG1 (hereinafter abbreviated as "MG1" as occasion demands), the motor generator MG2 (hereinafter abbreviated as "MG2" as occasion demands), an input shaft 420, and a drive shaft 500.

The engine 200 is one example of the "internal combustion engine" according to the present invention, and is configured to function as a main power source of the hybrid vehicle 1. The engine 200 is an engine that uses as fuel, for example, gasoline, light oil, alcohol fuel, or the like. The engine 200 is configured to enable combustion of an air-fuel mixture via an ignition operation by an ignition apparatus in which a part of a spark plug is exposed in a combustion chamber within a cylinder, and to convert reciprocating motion of a piston generated according to explosive force caused by the combustion into rotary motion of a crankshaft via a connecting rod.

In the vicinity of the crankshaft, there is disposed a crank position sensor configured to detect a rotational position (i.e. a crank angle) of the crankshaft. The crank position sensor is electrically connected to the ECU 100, and the ECU 100 is configured to calculate number of revolutions of the engine 200 on the basis of a crank angle signal outputted from the crank position sensor.

The engine 200 is configured to output power to the MG1-side power transmission mechanism 310 via the damper 410 and the input shaft 420.

The MG1-side power transmission mechanism 310 is provided with: a sun gear S1 disposed in a central part; a ring gear R1 concentrically disposed on an outer circumference of the sun gear S1; a plurality of pinion gears P1 disposed between the sun gear S1 and the ring gear R1, the pinion gears P1 revolving while rotating on the outer circumference of the sun gear S1; and a carrier C1 pivotally supporting rotating shafts of the respective pinion gears.

The sun gear S1 is coupled with a rotor(s) of the MG1 via a sun gear shaft. The ring gear R1 is coupled with the drive shaft 500. Moreover, the carrier C1 is coupled with the input shaft 420 of the engine 200.

The MG2-side power transmission mechanism 320 is provided with: a sun gear S2 disposed in a central part; a ring gear R2 concentrically disposed on an outer circumference of the sun gear S2; and a plurality of pinion gears P2 disposed between the sun gear S2 and the ring gear R2, the pinion gears P2 revolving while rotating on the outer circumference of the sun gear S2.

The sun gear S2 is coupled with a rotor(s) of the MG2 via a sun gear shaft. Moreover, the ring gear R2 is coupled with the drive shaft 500.

The motor generator MG1 is an electric motor generator provided with a power-running function for converting electric energy into kinetic energy and a regenerative function for converting kinetic energy into electric energy. The motor generator MG2 is an electric motor generator provided with the power running function for converting electric energy into kinetic energy and the regenerative function for converting kinetic energy into electric energy, as in the motor generator MG1.

Each of the motor generators MG1 and MG2 is configured, for example, as a synchronous motor generator, and is provided with a rotor(s) having a plurality of permanent magnets on an outer circumferential surface, and a stator around which a three-phase coil for forming a rotating magnetic field is wound. The motor generators, however, may have another configuration. The motor generator MG1 and the motor generator MG2 are configured as one example of the "motor" according to the present invention.

Hereinafter, if the motor generator MG1 and the motor generator MG2 are used for explanation without distinction, they will be simply referred to as the MG in some cases.

The drive shaft 500 is coupled with drive shafts SFR and SFL (refer to FIG. 1) that respectively drive a right front wheel FR and a left front wheel FL, which are drive wheels of the hybrid vehicle 1.

In the embodiment, the hybrid vehicle 1 is exemplified and explained as one example of the vehicle according to the present invention; however, any vehicle that is provided with the motor (i.e. the motor generator MG) could be used even if the vehicle is other than the hybrid vehicle. For example, even an electric vehicle that is not provided with the engine 200 could be one example of the vehicle according to the present invention.

<Characteristics of Motor>

Figure 3:
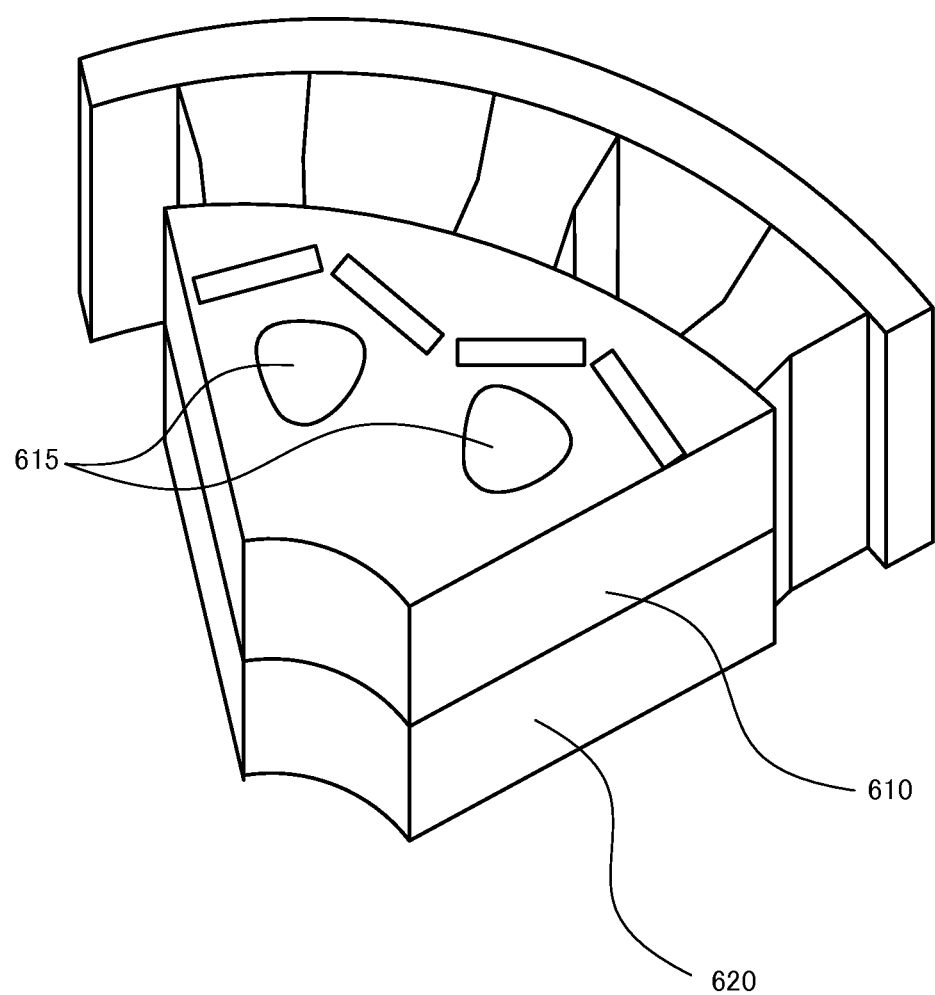
FIG. 3 is an enlarged cross sectional view illustrating a configuration of rotors during a characteristic A.
Figure 4:
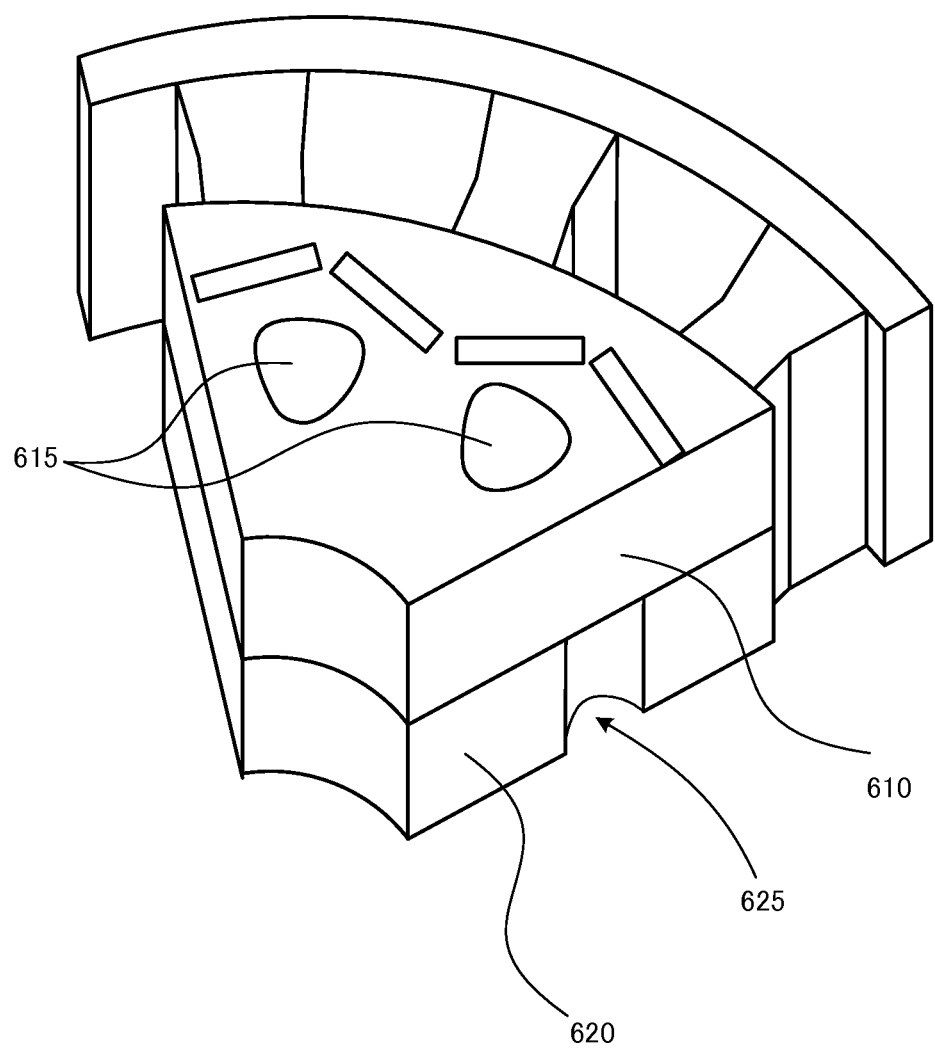
FIG. 4 is an enlarged cross sectional view illustrating a configuration of the rotors during a characteristic B.
Figure 5:
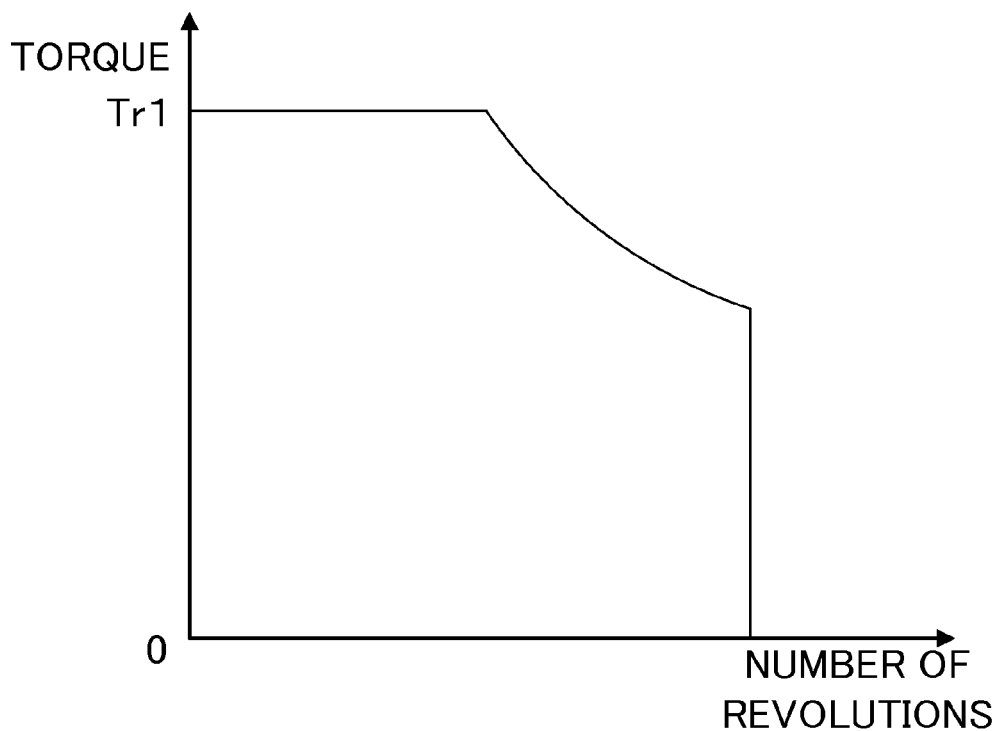
FIG. 5 is a graph illustrating a relation between torque and number of revolutions of a motor generator considered to have the characteristic A.
Figure 6:
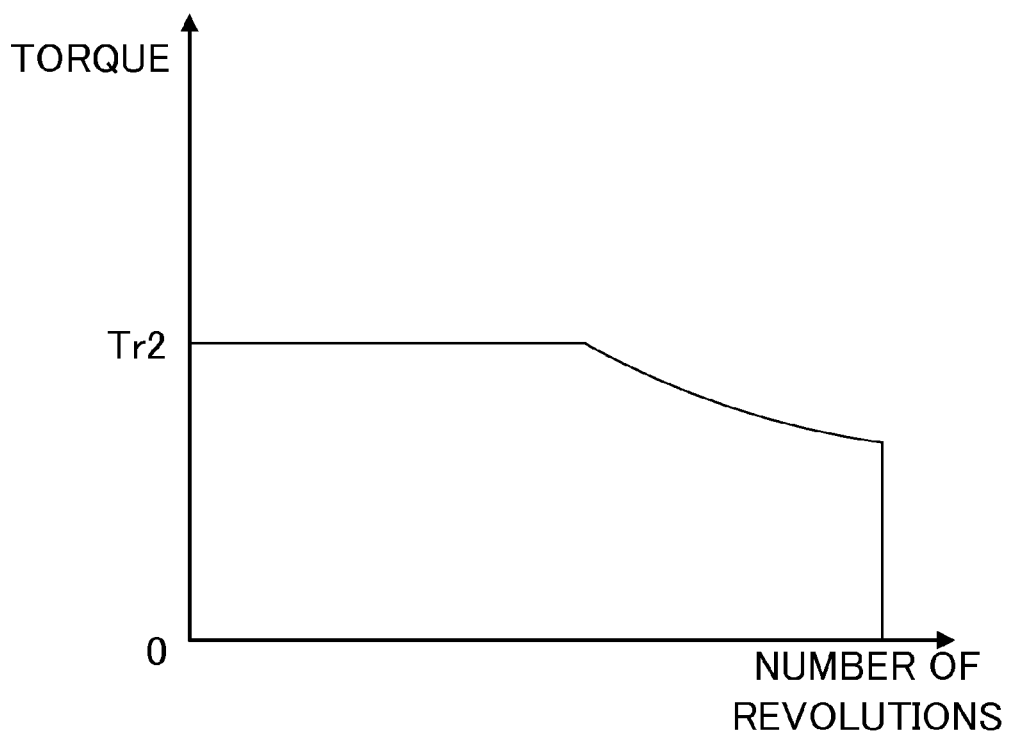
FIG. 6 is a graph illustrating a relation between the torque and the number of revolutions of the motor generator considered to have the characteristic B.

Next, two characteristics that can be realized by the aforementioned motor generator MG will be explained with reference to FIG. 3 to FIG. 6. FIG. 3 is an enlarged cross sectional view illustrating a configuration of the rotors during a characteristic A. FIG. 4 is an enlarged cross sectional view illustrating a configuration of the rotors during a characteristic B. FIG. 5 is a graph illustrating a relation between torque and the number of revolutions of the motor generator considered to have the characteristic A. FIG. 6 is a graph illustrating a relation between the torque and the number of revolutions of the motor generator considered to have the characteristic B.

In FIG. 3 and FIG. 4, the motor generator MG according to the embodiment is provided with a first rotor 610 and a second rotor 620, which are divided in a rotating shaft direction. First rotor cavities 615 are formed in the first rotor 610, and second rotor cavities 625 are formed in the second rotor 620.

In particular, the motor generator MG according to the embodiment can realize the two characteristics, which are different from each other, by changing a relative phase (or rotation angle) of the first rotor 610 and the second rotor 620. Specifically, as illustrated in FIG. 3, if the first rotor 610 and the second rotor 620 have relatively the same phase, the motor generator MG is considered to have the characteristic A. On the other hand, as illustrated in FIG. 4, if the first rotor 610 and the second rotor 620 have relatively different phases (refer to a positional relation between the first rotor cavities 615 and the second rotor cavities 625), the motor generator MG is considered to have the characteristic B. Such a characteristic change is caused by a change in magnetic field characteristics of the motor generator MG.

In FIG. 5, the characteristic A in which the first rotor 610 and the second rotor 620 have relatively the same phase is one example of the "first characteristic" according to the present invention, and is such a characteristic that maximum rated torque Tr1 of the motor generator MG is set as an output upper limit. The torque Tr1 here is one example of the "first predetermined torque" according to the present invention. The characteristic A is realized, for example, at the start of the vehicle in which relatively high torque is required, or in similar cases.

In FIG. 6, the second characteristic in which the first rotor 610 and the second rotor 620 have relatively different phases is one example of the "second characteristic" according to the present invention, and is such a characteristic that torque Tr2, which is lower than the maximum rated torque Tr1, is set as the output upper limit. The torque Tr2 here is one example of the "second predetermined torque" according to the present invention. The characteristic B is realized, for example, during high-speed running in which relatively high rotation is required but high torque is not required, or in similar cases.

The torque Tr1 may not be the maximum rated torque if having a higher value than that of the torque Tr2. Even in such a case, a technical effect according to the embodiment described later is properly exerted. The torque Tr1, however, preferably has as a high value as possible in order to remarkably exert the effect according to the embodiment described later.

Moreover, here, an explanation is given to the case where the characteristic A in which the relatively high torque Tr1 is set as the output upper limit is realized if the first rotor 610 and the second rotor 620 have relatively the same phase and where the characteristic B in which the relatively low torque Tr2 is set as the output upper limit is realized if the first rotor 610 and the second rotor 620 have relatively different phases. The relative phase and the characteristics, however, may have an opposite relation. In other words, the characteristic B in which the relatively low torque Tr2 is set as the output upper limit may be realized if the first rotor 610 and the second rotor 620 have relatively the same phase, and the characteristic A in which the relatively high torque Tr1 is set as the output upper limit may be realized if the first rotor 610 and the second rotor 620 have relatively different phases.

The switching between the characteristics of the motor generator MG can be also realized by rotors divided not in the rotating shaft direction as described above but in a circumferential direction. Moreover, the switching between the characteristics of the motor generator MG may be also realized without using the change in the relative phase of the divided rotors. For example, if the rotor(s) is provided with a plurality of different winding wires, changing a winding wire to be used also makes it possible to change between the characteristics. The characteristics of the motor generator MG may not necessarily depend on the magnetic field characteristics, unlike the embodiment.

As described above, the motor generator MG according to the embodiment can realize the plurality of characteristics in which the output upper limits of the torque are different from each other. It is thus possible to increase operation efficiency of the motor generator MG by switching between the characteristics of the motor generator MG, as occasion demands, according to a running state of the hybrid vehicle 1.

The hybrid vehicle 1 according to the embodiment is provided with the two moor generators MG1 and MG2; however, not both of the motor generators need to be able to switch between the characteristics. If at least one of the motor generators can switch between the characteristics, the technical effect according to the embodiment described later can be obtained.

<Apparatus Configuration>

Figure 7:
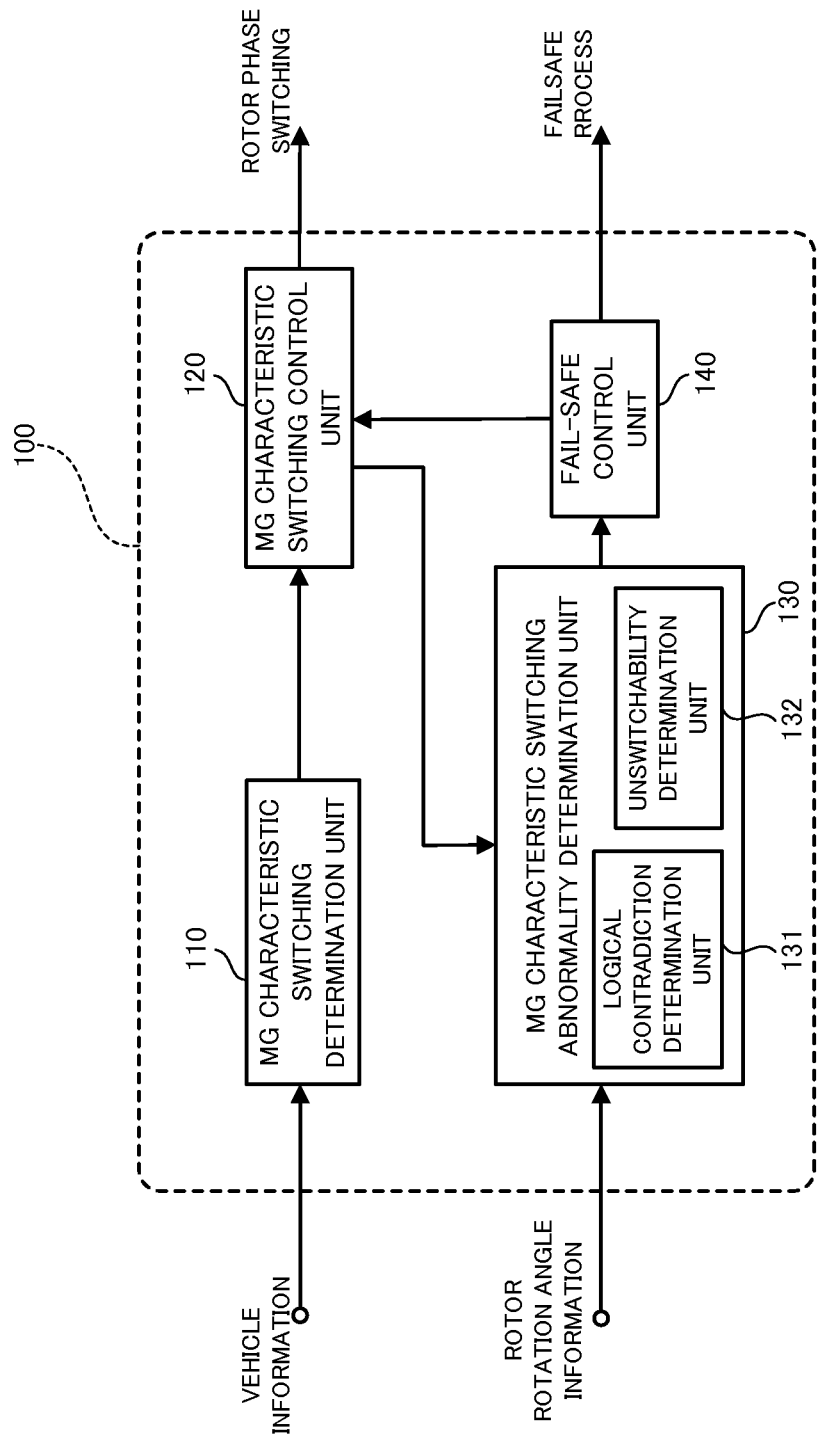
FIG. 7 is a block diagram illustrating a configuration of an ECU.

Next, a specific configuration of the ECU 100, which is one example of the control apparatus for the vehicle motor according to the embodiment, will be explained with reference to FIG. 7. FIG. 7 is a block diagram illustrating the configuration of the ECU according to the embodiment. FIG. 7 illustrates only an element(s) that is deeply related to the embodiment, out of elements included in the ECU 100, and illustration of the other elements is omitted, as occasion demands.

In FIG. 7, the ECU 100 according to the embodiment is provided with a MG characteristic switching determination unit 110, a MG characteristic switching control unit 120, a MG characteristic switching abnormality determination unit 130, and a fail-safe control unit 140.

The MG characteristic switching determination unit 110 determines which characteristic out of a characteristic A and a characteristic B that can be realized by the motor is to be realized, on the basis of various parameters obtained from the vehicle (e.g. accelerator opening degree information obtained from the accelerator opening sensor 13, vehicle speed information obtained from the vehicle speed sensor 14, etc.). A determination result of the MG characteristic switching determination unit 110 is outputted to the MG characteristic switching control unit 120.

The MG characteristic switching control unit 120 is one example of the "characteristic switching device" according to the present invention, and can switch between the characteristics of the motor generator MG by changing the relative phase of the first rotor 610 and the second rotor 620, as explained with reference to FIG. 3 to FIG. 6. The MG characteristic switching control unit 120 is configured to output a switching control result (i.e. information indicating to which characteristic it is switched) to the MG characteristic switching abnormality determination unit 130.

The MG characteristic switching abnormality determination unit 130 is one example of the "characteristic switching abnormality determining device" according to the present invention, and determines whether or not there is an abnormality in the characteristic switching control performed by the MG characteristic switching control unit 120. The MG characteristic switching abnormality determination unit 130 is provided with a logical contradiction determination unit 131 and an unswitchability determination unit 132, which respectively determine different abnormal states.

The logical contradiction determination unit 131 is one example of the "logical contradiction determining device" according to the present invention, and determines whether or not there is a logical contradiction in which a characteristic to which it is to be switched by the characteristic switching control performed immediately before (i.e. a characteristic to be currently realized) and an actual characteristic of the motor currently realized are different from each other. The occurrence of the logical contradiction can be determined, for example, by comparing the characteristic stored in a storage unit, which is configured to store the characteristic of the motor generator MG after the characteristic switching control, with the characteristic detected in real time.

The unswitchability determination unit 132 is one example of the "unswitchability determining device" according to the present invention, and determines that the characteristic of the motor generator MG is unswitchable. The unswitchability can occur, for example, due to mechanical failures of a mechanism for switching between the characteristics, or the like. The unswitchability can be determined, for example, by whether or not there is a change in the characteristics before and after actual implementation of the characteristic switching control.

The MG characteristic switching abnormality determination unit 130 may be provided with only either one of the logical contradiction determination unit 131 and the unswitchability determination unit 132 described above. Alternatively, the MG characteristic switching abnormality determination unit 130 may be configured to determine an abnormality other than the logical contradiction and the unswitchability. If it is determined on the MG characteristic switching abnormality determination unit 130 that there is the abnormality in the characteristic switching control performed by the MG characteristic switching control unit 120, the determination result is outputted to the fail-safe control unit 140.

The fail-safe control unit 140 is one example of the "fail-safe performing device" according to the present invention, and performs a fail-safe process according to the characteristic of the motor generator MG and an abnormality type if there is the abnormality in the characteristic switching control of the motor generator MG. The fail-safe control unit 140 is configured to output a characteristic switching demand to the MG characteristic switching control unit 120 in order to perform the fail-safe process. The specific fail-safe process will be detailed later.

The ECU 100 including the aforementioned respective parts is an integrally-configured electronic control unit, and is configured in such a manner that the operations associated with the aforementioned respective parts are all performed by the ECU 100. Physical, mechanical, and electrical configurations of the aforementioned parts according to the present invention, however, are not limited to this example. For example, the respective parts may be configured as various computer systems such as a plurality of ECU, various processing units, or various controllers or microcomputer apparatuses.

<Explanation of Operation>

Next, operation of the control apparatus for the vehicle motor according to the embodiment will be explained by exemplifying a plurality of embodiments. Hereinafter, out of all the processes performed by the control apparatus for the vehicle motor according to the embodiment, a process that is unique to the embodiment will be explained in detail, and the explanation of the other general processes will be omitted, as occasion demands.

<First Embodiment>

Figure 8:
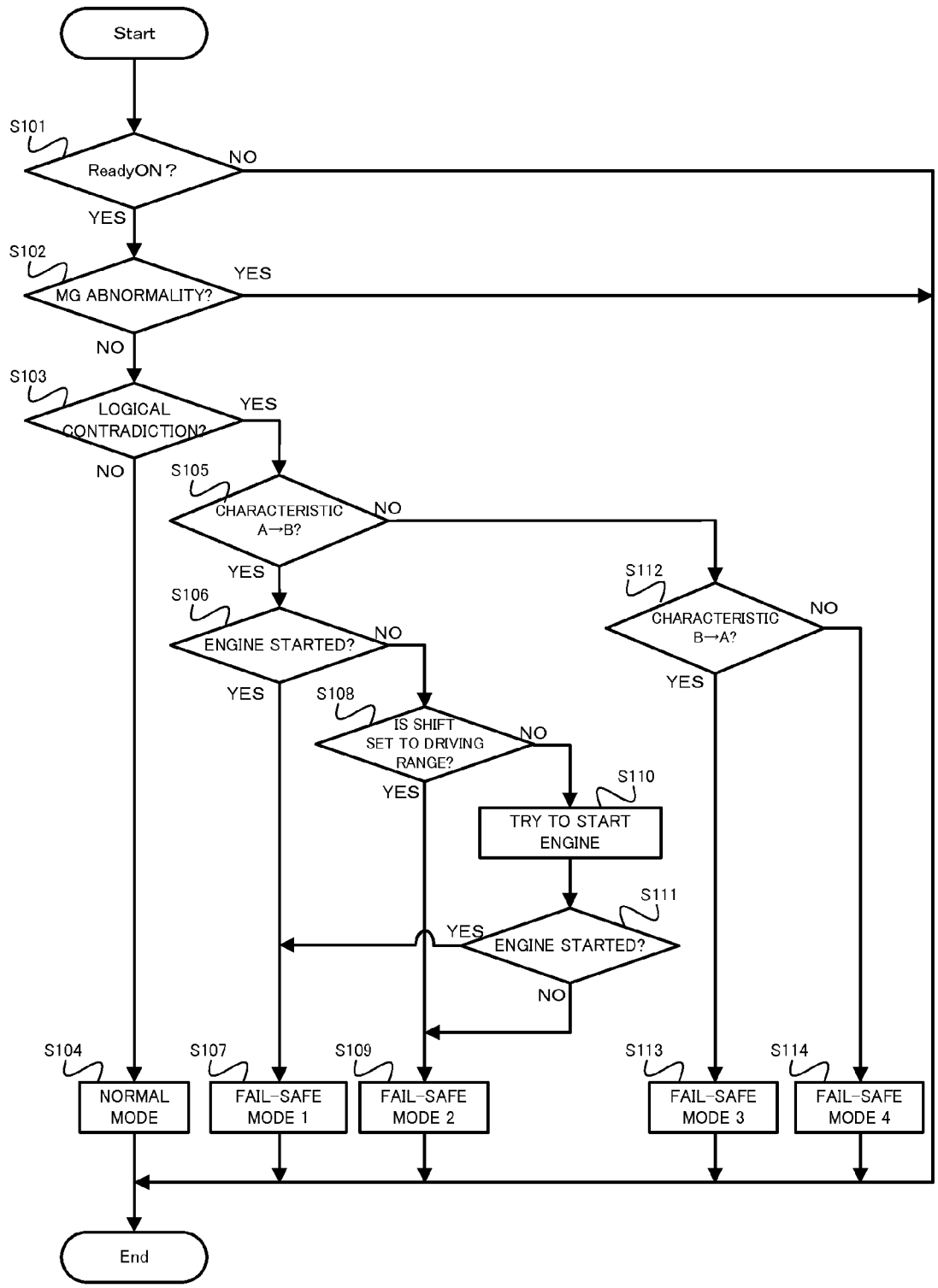
FIG. 8 is a flowchart (ver. 1) illustrating operation of the control apparatus for the vehicle motor according to a first embodiment.

Firstly, the operation of the control apparatus for the vehicle motor according to a first embodiment will be explained with reference to FIG. 8. FIG. 8 is a flowchart illustrating the operation of the control apparatus for the vehicle motor according to the first embodiment. FIG. 8 explains a process that uses the logical contradiction abnormality as a trigger, out of the two types of abnormalities, which are the logical contradiction abnormality and the unswitchability abnormality, determined by the MG characteristic switching abnormality determination unit 130.

In FIG. 8, in operation of the control apparatus for the vehicle motor according to the embodiment, it is firstly determined whether or not a system of the vehicle is ON (step S101). If the system of the vehicle is not ON (the step S101: NO), the subsequent process is not performed. In other words, the control apparatus for the vehicle motor according to the embodiment performs the process on the abnormality in the characteristic switching control if the vehicle can run.

If it is determined that the system of the vehicle is ON (the step S101: YES), it is determined whether or not there is an abnormality in the motor generator MG (step S102). The abnormality herein includes not only an abnormality associated with basic movements, such as a state in which the motor generator MG does not work and a state in which there is a problem in the number of revolutions, but also an abnormality regarding the characteristic switching control of the motor generator MG (e.g. the logical contradiction abnormality described later, etc.).

Here, if there is the abnormality in the motor generator MG (the step S102: YES), the motor generator MG itself has the abnormality. It is thus determined that there is a possibility that the appropriate fail-safe process cannot be performed, and the process after a step S103 is omitted. Moreover, a series of process steps illustrated in FIG. 8 are repeatedly performed. Therefore, for example, even if there is the abnormality regarding the characteristic switching of the motor generator MG in the previous determination and the fail-safe described later is already performed, the process after the step S103 is omitted so that the determination process is not repeatedly performed.

Figure 9:
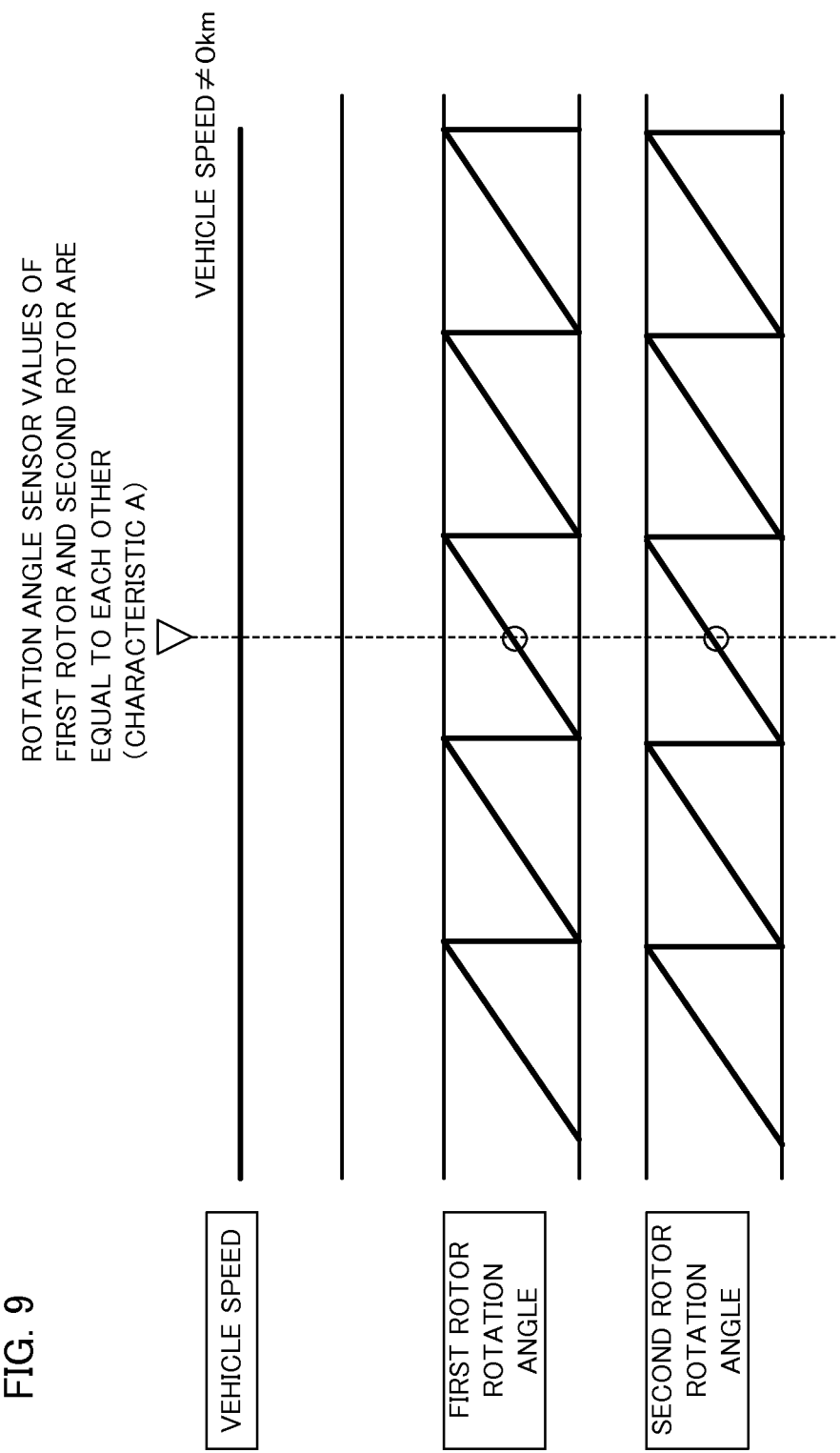
FIG. 9 is a time chart (ver. 1) illustrating a method of determining a motor generator characteristic.
Figure 10:
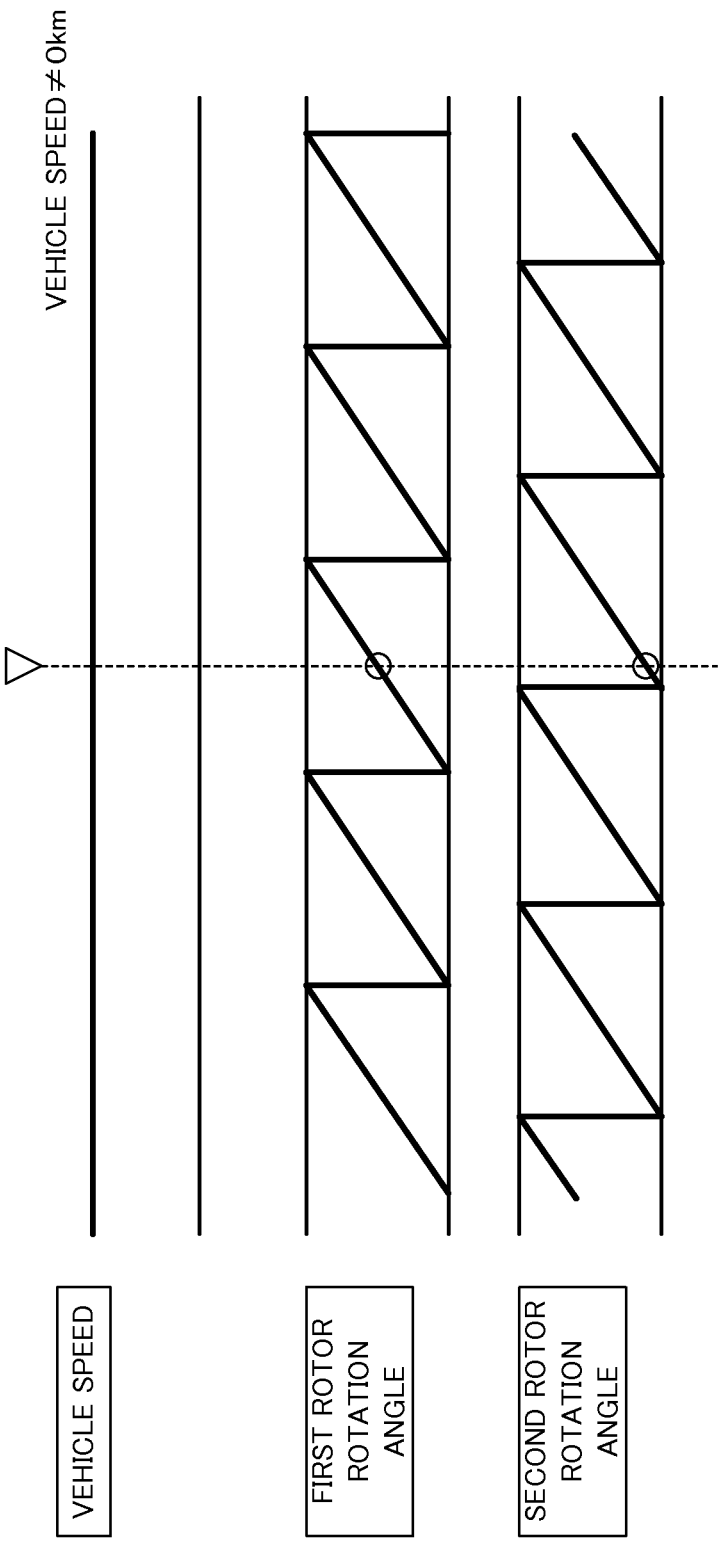
FIG. 10 is a time chart (ver. 2) illustrating the method of determining the motor generator characteristic.
Figure 11:
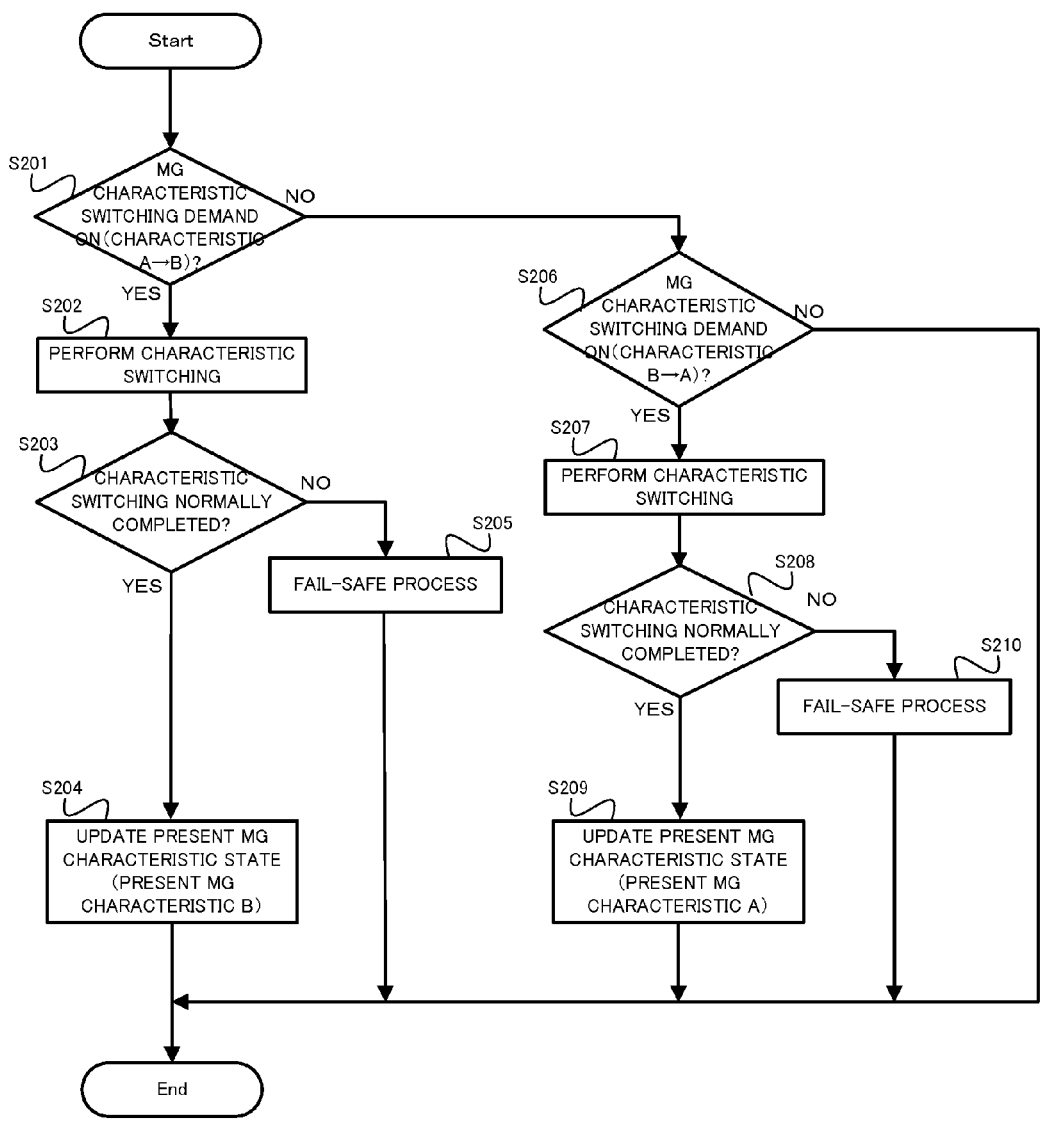
FIG. 11 is a flowchart illustrating operation of a characteristic storage unit used for characteristic determination.
Figure 12:
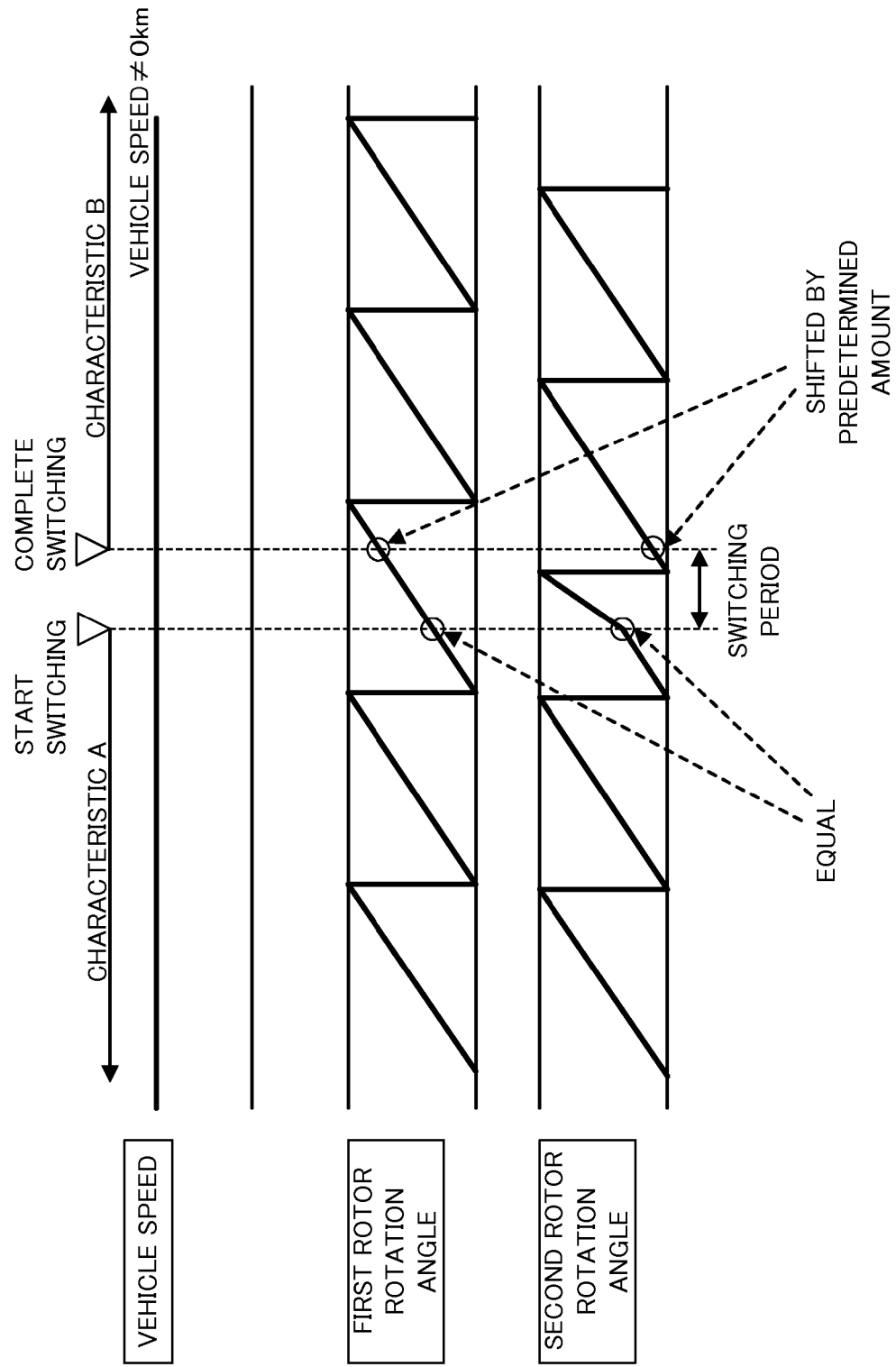
FIG. 12 is a time chart illustrating characteristic switching control from the characteristic A to the characteristic B.
Figure 13:
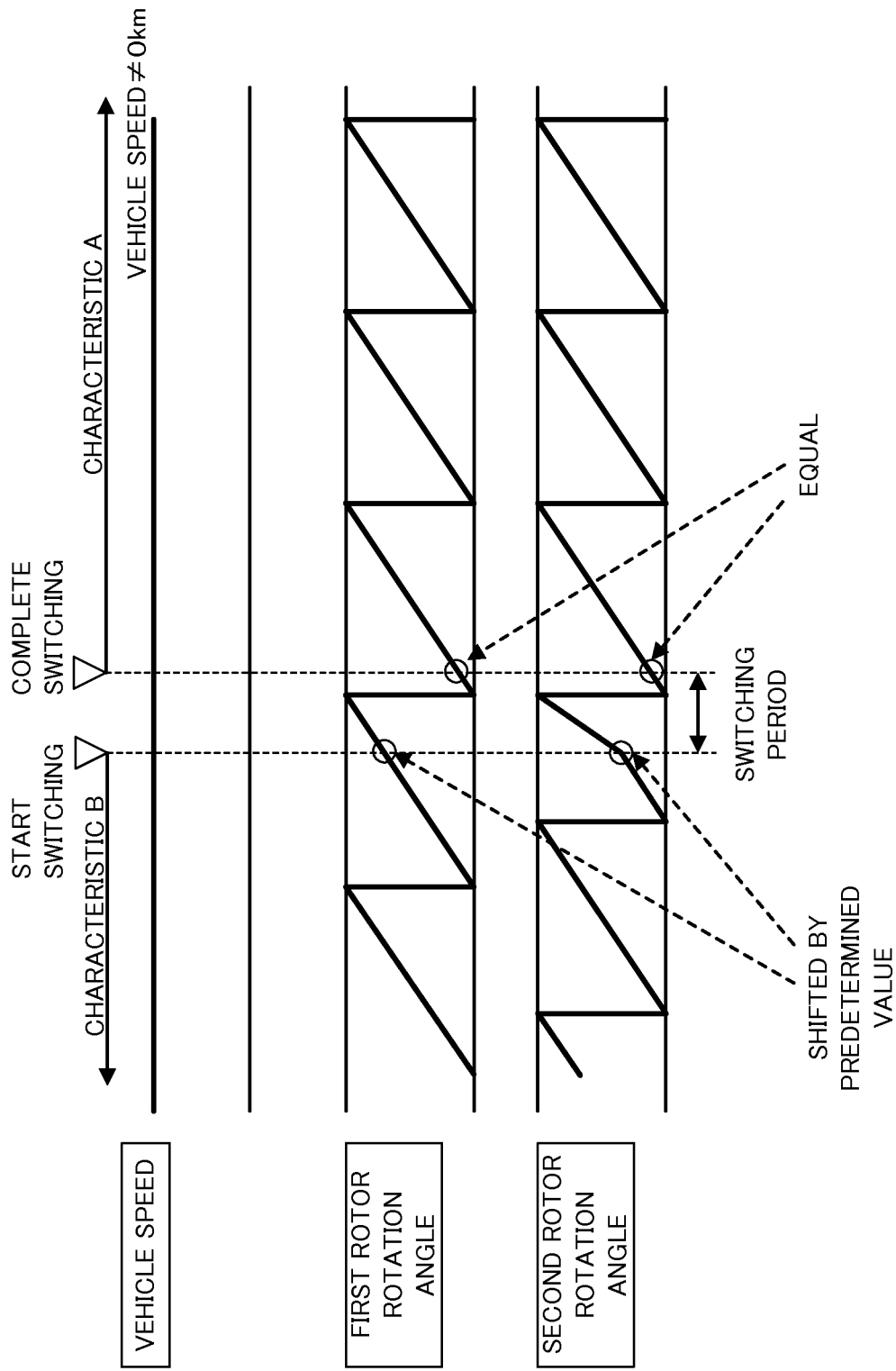
FIG. 13 is a time chart illustrating characteristic switching control from the characteristic B to the characteristic A.

If it is determined that there is no abnormality in the motor generator MG (the step S102: NO), it is determined on the logical contradiction determination unit 131 whether or not there is a logical contradiction abnormality in the characteristic of the motor generator MG (the step S103). Hereinafter, the determination of the logical contradiction abnormality will be explained in detail with reference to FIG. 9 to FIG. 13. FIG. 9 is a time chart (ver. 1) illustrating a method of determining the motor generator characteristic. FIG. 10 is a time chart (ver. 2) illustrating the method of determining the motor generator characteristic. FIG. 11 is a flowchart illustrating operation of the characteristic storage unit used for characteristic determination. FIG. 12 is a time chart illustrating characteristic switching control from the characteristic A to the characteristic B. FIG. 13 is a time chart illustrating characteristic switching control from the characteristic B to the characteristic A.

In FIG. 9 and FIG. 10, the characteristic of the motor generator MG can be determined by comparing the phases of the first rotor 610 and the second rotor 620 (refer to FIG. 3 and FIG. 4) of the motor generator MG. Specifically, for example, as illustrated in FIG. 9, if the first rotor 610 and the second rotor 620 have the same phase, the characteristic can be determined to be the characteristic A. Moreover, as illustrated in FIG. 10, if the first rotor 610 and the second rotor 620 have different phases and a phase difference thereof is a predetermined value corresponding to the characteristic B, the characteristic can be determined to be the characteristic B.

The logical contradiction determination unit 131 uses the characteristic of the motor generator MG determined in this manner, thereby determining whether or not there is the logical contradiction abnormality. For example, the logical contradiction determination unit 131 compares the characteristic stored in the characteristic storage unit (not illustrated) after the characteristic switching control performed immediately before, with the present characteristic. If the characteristics are different from each other, the logical contradiction determination unit 131 determines that there is the logical contradiction abnormality. Hereinafter, a process regarding the storage of the characteristic in the characteristic storage unit will be explained.

In FIG. 11, in operation of the control apparatus for the vehicle motor according to the embodiment, if a demand is given by the MG characteristic switching determination unit 110 to switch the characteristic of the motor generator MG from the characteristic A to the characteristic B (step S201: YES), the characteristic switching control is performed by the MG characteristic switching control unit 120 so that the characteristic of the motor generator MG is set to the characteristic B (step S202).

In FIG. 12, in the switching control from the characteristic A to the characteristic B, the rotation angle of the second rotor, which has the same value as the rotation angle of the first rotor 610 so far, is changed to be shifted by a predetermined value from the rotation angle of the first rotor 610. Specifically, as illustrated in FIG. 12, in a switching period, the rotation angle of the second rotor 620 is controlled to be changed more suddenly than the rotation angle of the first rotor 610. Instead of the rotation angle of the second rotor 620, the rotation angle of the first rotor 610 may be controlled. Alternatively, the respective rotation angles of the first rotor 610 and the second rotor 620 may be controlled.

Back in FIG. 11, after the characteristic switching control, it is determined by the MG characteristic switching abnormality determination unit 130 whether or not the characteristic switching control is normally completed (step S203). In other words, it is determined whether or not the characteristic of the motor generator MG is the characteristic B.

Here, if it is determined that the characteristic switching control is normally completed (step S203: YES), the present MG characteristic stored in the characteristic storage unit is updated (step S204). In other words, the present characteristic of the motor generator MG is newly stored as the characteristic B. On the other hand, if it is determined that the characteristic switching control is not normally completed (i.e. that there is some abnormality) (step S203: NO), the MG characteristic stored in the characteristic storage unit is not updated (i.e. the characteristic A remains unchanged), and the fail-safe process described later is performed (step S205).

On the other hand, the same applies even if there is a demand to switch the characteristic of the motor generator MG from the characteristic B to the characteristic A (step S206: YES). The characteristic switching control is performed by the MG characteristic switching control unit 120 so that the characteristic of the motor generator MG is set to the characteristic A (step S207).

In FIG. 13, in the switching control from the characteristic B to the characteristic A, the rotation angle of the second rotor, which is shifted by the predetermined value from the rotation angle of the first rotor 610 so far, is changed to be equal to the rotation angle of the first rotor 610. Specifically, as illustrated in FIG. 13, in a switching period, the rotation angle of the second rotor 620 is controlled to be changed more suddenly than the rotation angle of the first rotor 610. Even in this case, instead of the rotation angle of the second rotor 620, the rotation angle of the first rotor 610 may be controlled. Alternatively, the respective rotation angles of the first rotor 610 and the second rotor 620 may be controlled.

Back in FIG. 11 again, after the characteristic switching control, it is determined by the MG characteristic switching abnormality determination unit 130 whether or not the characteristic switching control is normally completed (step S208). In other words, it is determined whether or not the characteristic of the motor generator MG is the characteristic A.

If it is determined that the characteristic switching control is normally completed (step S208: YES), the present MG characteristic stored in the characteristic storage unit is updated (step S209). In other words, the present characteristic of the motor generator MG is newly stored as the characteristic A. On the other hand, if it is determined that the characteristic switching control is not normally (step S208: NO), the MG characteristic stored in the characteristic storage unit is not updated (i.e. the characteristic B remains unchanged), and the fail-safe process described later is performed (step S210).

As described above, the characteristic stored in the characteristic storage unit is updated only if the characteristic switching is normally completed. Thus, the characteristic stored in the characteristic storage unit and the present characteristic of the motor generator MG should be theoretically equal to each other. However, due to some abnormality, the characteristic stored in the characteristic storage unit and the present characteristic of the motor generator MG are possibly different from each other. The logical contradiction determination unit 131 determines such an abnormality to be the logical contradiction abnormality.

Back in FIG. 8, if it is determined that there is no logical contradiction abnormality (the step S103: NO), the motor generator MG is controlled in a normal mode (step S104). In other words, the fail-safe process by the fail-safe control unit 140 is not performed. On the other hand, if it is determined that there is the logical contradiction abnormality (the step S103: YES), the motor generator MG is controlled in various fail-safe modes described later. In other words, the fail-safe process according to the characteristic is performed by the fail-safe control unit 140.

If it is determined that there is the logical contradiction abnormality (the step S103: YES), regarding the occurring logical contradiction abnormality, it is determined whether or not the characteristic is the characteristic B even though it is to be the characteristic A (step S105). In other words, it is determined whether or not the characteristic stored in the characteristic storage unit is the characteristic A and the actual characteristic is the characteristic B (hereinafter referred to as a "logical contradiction A→B", as occasion demands).

If the occurring logical contradiction abnormality is the logical contradiction A→B (the step S105: YES), it is determined whether or not the engine 200 is started (step S106). If it is determined that the engine 200 is started (the step S106: YES), the motor generator MG is controlled in a fail-safe mode 1 (step S107).

The fail-safe mode 1 is a fail-safe mode corresponding to a case where there is the logical contradiction A→B and the engine 200 is started. For example, a fail-safe process for responding to an insufficient driving force caused by the occurrence of the logical contradiction A→B, or the like is performed. More specifically, in the fail-safe mode 1, load restriction on the engine 200, driving force restriction on the motor generator MG, or the like is performed. Moreover, in order to call a driver's attention, a vehicle interior warning lamp is lightened. In addition, another fail-safe process that can reduce a disadvantage in the situation in which there is the logical contradiction A→B and the engine 200 is started may be also performed.

On the other hand, if it is determined that the engine 200 is not started (the step S106: NO), it is determined whether or not a shift or transmission of the vehicle is set to a driving range (i.e. a range other than a parking (P) range) (step S108). If it is determined that the shift of the vehicle is set to the driving range (the step S108: YES), the motor generator MG is controlled in a fail-safe mode 2 (step S109).

The fail-safe mode 2 is a fail-safe mode corresponding to a case where there is the logical contradiction A→B and the engine 200 is not started. For example, the fail-safe process for responding to the insufficient driving force caused by the occurrence of the logical contradiction A→B, a fail-safe process for responding to an insufficient driving force caused by that the engine 200 is not started, or the like is performed. More specifically, in the fail-safe mode 2, prohibition of the start of the engine 200 which prevents wasteful power consumption, a transition process to retreat running which does not use the engine 200, driving force restriction on the motor generator MG, or the like is performed. Moreover, as in the fail-safe mode 1, in order to call the driver's attention, the vehicle interior warning lamp is lightened. In addition, another fail-safe process that can reduce a disadvantage in the situation in which there is the logical contradiction A→B and the engine 200 is not started may be also performed.

On the other hand, if it is determined that the shift of the vehicle is set to a range other than the driving range (i.e. the P range) (the step S108: NO), a process for starting the engine 200 is performed (step S110). Specifically, the motor generator MG1 is controlled to output cranking torque to the engine 200. After the start control of the engine 200, it is determined whether or not the engine is normally started (step S111). If the engine 200 is normally started (the step S111: YES), the motor generator MG is controlled in the aforementioned fail-safe mode 1 (the step S107). On the other hand, if the engine 200 is not normally started (the step S111: NO), the motor generator MG is controlled in the aforementioned fail-safe mode 2 (the step S109).

If the occurring logical contradiction abnormality is not the logical contradiction A→B (the step S105: NO), regarding the occurring logical contradiction abnormality, it is determined whether or not the characteristic is the characteristic A even though it is expected to be the characteristic B (step S112). In other words, it is determined whether or not the characteristic stored in the characteristic storage unit is the characteristic B and the actual characteristic is the characteristic A (hereinafter referred to as a "logical contradiction B→A", as occasion demands).

If the occurring logical contradiction abnormality is the logical contradiction B→A (the step S112: YES), the motor generator MG is controlled in a fail-safe mode 3 (step S113).

The fail-safe mode 3 is a fail-safe mode corresponding to a case where there is the logical contradiction B→A. For example, a process for preventing overcharge of the battery 12 or deterioration of vibration, or the like is performed. More specifically, in the fail-safe mode 3, the motor generator MG is set in a weak field control mode (i.e. a mode that reduces the output upper limit), and boost control is performed on a boost converter so that inverter voltage is voltage calculated from a back electromotive force constant of the characteristic A stored in advance and from the present number of revolutions of the motor generator MG. The "back electromotive force constant" herein is a coefficient for converting the number of revolutions of the motor generator MG to induced voltage. Moreover, as in the fail-safe modes 1 and 2, in order to call the driver's attention, the vehicle interior warning lamp is lightened. In addition, another fail-safe process that can reduce a disadvantage in the situation in which there is the logical contradiction B→A may be also performed.

On the other hand, if the occurring logical contradiction abnormality is not the logical contradiction B→A (the step S112: NO), the motor generator MG is controlled in a fail-safe mode 4 (step S114). There can be a situation in which there is neither the logical contradiction A→B nor the logical contradiction B→A regardless of the occurrence of the logical contradiction, for example, if the present characteristic is a characteristic X, which is neither the characteristic A nor the characteristic B.

The fail-safe mode 4 is a fail-safe mode corresponding to a case where the present characteristic of the motor generator MG is unknown. In the fail-safe mode 4, for example, the motor generator MG is considered to be uncontrollable. As in the fail-safe modes 1 to 3, in order to call the driver's attention, the vehicle interior warning lamp is lightened. In addition, another fail-safe process that can reduce a disadvantage in the situation in which the characteristic of the motor generator MG is unknown.

As described above, in the control apparatus for the vehicle motor according to the embodiment, if there is the logical contradiction abnormality in the characteristic of the motor generator MG, the appropriate fail-safe process according to the characteristic is performed. This allows the vehicle to run while reducing the disadvantage caused by the occurrence of the logical contradiction abnormality.

Figure 14:
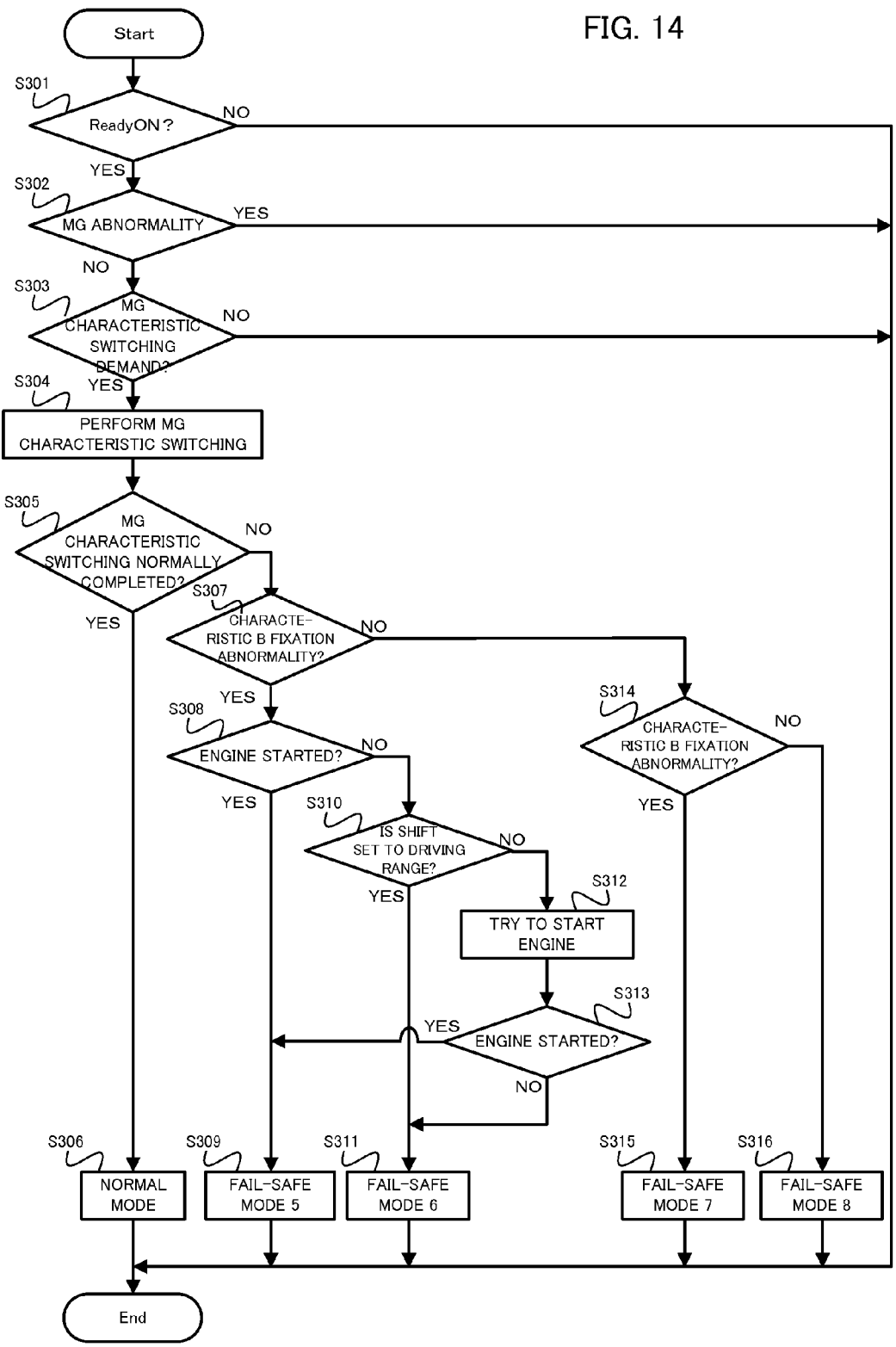
FIG. 14 is a flowchart (ver. 2) illustrating the operation of the control apparatus for the vehicle motor according to the first embodiment.

Next, with reference to FIG. 14, an explanation will be given to a process that uses the unswitchability abnormality as a trigger, out of the two types of abnormalities, which are the logical contradiction abnormality and the unswitchability abnormality, determined by the MG characteristic switching abnormality determination unit 130. A series of process steps that use the unswitchability abnormality as the trigger are similar to the series of process steps that use the logical contradiction abnormality as the trigger described above. Thus, a different point will be explained in detail, and an explanation of the same point will be omitted as occasion demands.

In FIG. 4, in operation of the control apparatus for the vehicle motor according to the embodiment, it is firstly determined whether or not the system of the vehicle is ON (step S301). If the system of the vehicle is not ON (the step S301: NO), the subsequent process is not performed. On the other hand, if it is determined that the system of the vehicle is ON (the step S301: YES), it is determined whether or not there is an abnormality in the motor generator MG (step S302). If it is determined that there is the abnormality in the motor generator MG (the step S302: YES), the subsequent process is not performed.

If it is determined that there is no abnormality in the motor generator MG (the step S302: NO), it is determined whether or not there is a characteristic switching demand from the MG characteristic switching determination unit 110 (step S303). If there is no characteristic switching demand (the step S303: NO), the subsequent process is omitted.

On the other hand, if there is the characteristic switching demand (the step S303: YES), the characteristic switching control of the motor generator MG is performed by the MG characteristic switching control unit 120 (step S304). Then, after the characteristic switching control, it is determined on the unswitchability determination unit 132 whether or not the characteristic switching control is normally completed (step S305). The unswitchability determination unit 132, for example, determines the present characteristic after the switching control, and determines whether it is changed to the characteristic to which it is to be switched by the switching control. This can make it possible to determine whether or not the characteristic of the motor generator MG is unswitchable. Such an unswitchable state can occur, for example, due to mechanical failures of a mechanism for switching between the characteristics.

If it is determined that there is no unswitchability abnormality (the step S305: YES), the motor generator MG is controlled in the normal mode (step S306). In other words, the fail-safe process by the fail-safe control unit 140 is not performed. On the other hand, if it is determined that there is the unswitchability abnormality (the step S305: NO), the motor generator MG is controlled in various fail-safe modes described later. In other words, the fail-safe process according to the characteristic is performed by the fail-safe control unit 140.

If it is determined that there is the unswitchability abnormality (the step S305: NO), it is determined whether or not the characteristic of the motor generator MG is fixed to the characteristic B (step S307). If it is determined that there is the characteristic B fixation abnormality (the step S307: YES), it is determined whether or not the engine 200 is started (step S308). Here, if it is determined that the engine 200 is started (the step S308: YES), the motor generator MG is controlled in a fail-safe mode 5 (step S309).

The fail-safe mode 5 is a fail-safe mode corresponding to a case where there is the characteristic B fixation abnormality and the engine is started. For example, a fail-safe process for responding to an insufficient driving force caused by the fixation of the characteristic to B, or the like is performed. More specifically, in the fail-safe mode 5, as in the fail-safe mode 1 described above, the load restriction on the engine 200, the driving force restriction on the motor generator MG, or the like is performed. Moreover, in order to call the driver's attention, the vehicle interior warning lamp is lightened. In addition, another fail-safe process that can reduce a disadvantage in the situation in which there is the characteristic B fixation abnormality and the engine 200 is started may be also performed. Moreover, particularly in the fail-safe mode 5, unlike the case of the logical contradiction abnormality illustrated in FIG. 8, it can be determined that the characteristic of the motor generator MG is fixed (i.e. that the characteristic is not changed regardless of the implementation of the characteristic switching control). Thus, the prohibition of the characteristic switching control can suppress power consumption.

On the other hand, if it is determined that the engine 200 is not started (the step S308: NO), it is further determined whether or not the shift or transmission of the vehicle is set to the driving range (step S310). If it is determined that the shift of the vehicle is set to the driving range (the step S310: YES), the motor generator MG is controlled in a fail-safe mode 6 (step S311).

The fail-safe mode 6 is a fail-safe mode corresponding to a case where there is the characteristic B fixation abnormality and the engine 200 is not started. For example, the fail-safe process for responding to the insufficient driving force caused by the fixation of the characteristic to B, the fail-safe process for responding to the insufficient driving force caused by that the engine 200 is not started, or the like is performed. More specifically, in the fail-safe mode 6, as in the fail-safe mode 2, the prohibition of the start of the engine 200 which prevents wasteful power consumption, the transition process to retreat running which does not use the engine 200, the driving force restriction on the motor generator MG, or the like is performed. Moreover, in order to call the driver's attention, the vehicle interior warning lamp is lightened. In addition, another fail-safe process that can reduce a disadvantage in the situation in which there is the characteristic B fixation abnormality and the engine 200 is not started may be also performed. Particularly in the fail-safe mode 6, as in the fail-safe mode 5, it can be determined that the characteristic of the motor generator MG is fixed. Thus, the prohibition of the characteristic switching control can suppress power consumption.

On the other hand, if it is determined that the shift of the vehicle is set to a range other than the driving range (the step S310: NO), a process for starting the engine 200 is performed (step S312). After the start control of the engine 200, it is determined whether or not the engine is normally started (step S313). If the engine 200 is normally started (the step S313: YES), the motor generator MG is controlled in the aforementioned fail-safe mode 5 (the step S309). On the other hand, if the engine 200 is not normally started (the step S313: NO), the motor generator MG is controlled in the aforementioned fail-safe mode 6 (the step S311).

If the occurring unswitchability abnormality is not the characteristic B fixation abnormality (the step S307: NO), it is determined whether or not the characteristic of the motor generator MG is fixed to the characteristic A (step S314). If there is the characteristic A fixation abnormality (the step S314: YES), the motor generator MG is controlled in a fail-safe mode 7 (step S315).

The fail-safe mode 7 is a fail-safe mode corresponding to a case where there is the characteristic A fixation abnormality. For example, the process for preventing the overcharge of the battery 12, the process for preventing the deterioration of vibration, or the like is performed. More specifically, in the fail-safe mode 7, as in the aforementioned fail-safe mode 3, the motor generator MG is set in the weak field control mode, and the boost control is performed on the boost converter so that the inverter voltage is the voltage calculated from the back electromotive force constant of the characteristic A stored in advance and from the present number of revolutions of the motor generator MG. Moreover, in order to call the driver's attention, the vehicle interior warning lamp is lightened. In addition, another fail-safe process that can reduce a disadvantage in the situation in which there is the characteristic A fixation abnormality may be also performed. Particularly in the fail-safe mode 7, as in the fail-safe modes 5 and 6, it can be determined that the characteristic of the motor generator MG is fixed. Thus, the prohibition of the characteristic switching control can suppress power consumption.

On the other hand, if the occurring unswitchability abnormality is not the characteristic A fixation abnormality (the step S314: NO), the motor generator MG is controlled in a fail-safe mode 8 (step S316). There can be a situation in which there is neither the characteristic B fixation abnormality nor the characteristic A fixation abnormality regardless of the occurrence of the unswitchability, for example, if the present characteristic of the motor generator MG is the characteristic X, which is neither the characteristic A nor the characteristic B.

The fail-safe mode 8 is a fail-safe mode corresponding to a case where the present characteristic of the motor generator MG is unknown. In the fail-safe mode 8, as in the aforementioned fail-safe mode 4, for example, the motor generator MG is considered to be uncontrollable. In order to call the driver's attention, the vehicle interior warning lamp is lightened. In addition, another fail-safe process that can reduce a disadvantage in the situation in which the characteristic of the motor generator MG is unknown. Particularly in the fail-safe mode 8, as in the fail-safe modes 5 to 7, it can be determined that the characteristic of the motor generator MG is fixed. Thus, the prohibition of the characteristic switching control can suppress power consumption.

As described above, in the control apparatus for the vehicle motor according to the embodiment, if there is the unswitchability abnormality in the characteristic of the motor generator MG, the appropriate fail-safe process according to the characteristic is performed. This allows the vehicle to run while reducing the disadvantage caused by the occurrence of the unswitchability abnormality.

As the abnormality in the characteristic switching control, the logical contradiction abnormality and the unswitchability abnormality are exemplified here; however, another abnormality can be also determined. Even if only one of the logical contradiction abnormality and the unswitchability abnormality can be determined, the effect according to the embodiment can be properly demonstrated.

<Second Embodiment>

Figure 15:
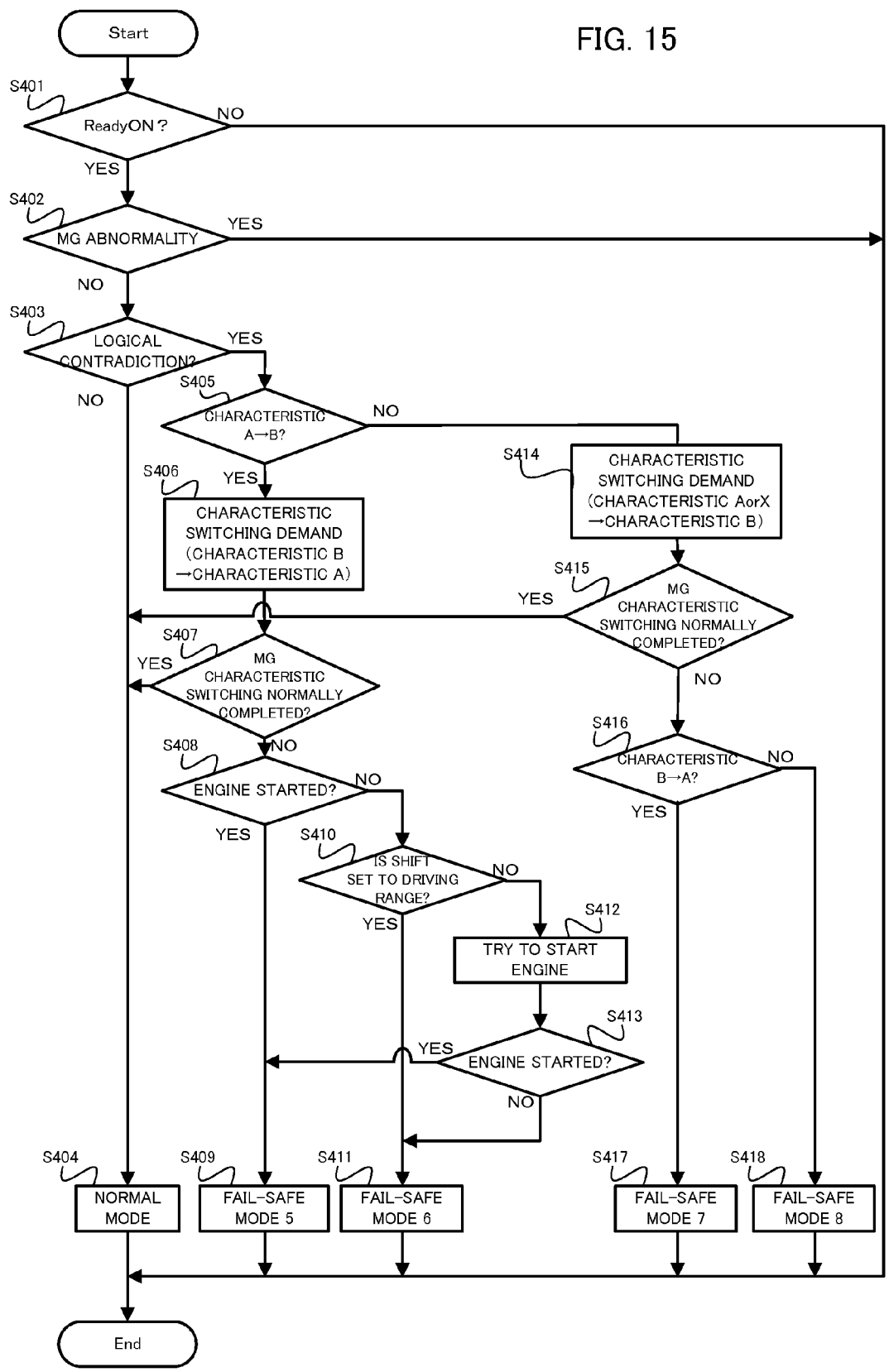
FIG. 15 is a flowchart illustrating the operation of the control apparatus for the vehicle motor according to a second embodiment.

Next, the operation of the control apparatus for the vehicle motor according to a second embodiment will be explained with reference to FIG. 15. FIG. 15 is a flowchart illustrating the operation of the control apparatus for the vehicle motor according to the second embodiment.

The second embodiment is different from the aforementioned first embodiment only in partial operation, and is substantially the same in another part. Thus, hereinafter, the different part from the first embodiment will be explained in detail, and an explanation of the same part will be omitted.

In FIG. 15, in operation of the control apparatus for the vehicle motor according to the second embodiment, it is firstly determined whether or not the system of the vehicle is ON (step S401). If the system of the vehicle is not ON (the step S401: NO), the subsequent process is not performed.

On the other hand, if it is determined that the system of the vehicle is ON (the step S401: YES), it is determined whether or not there is an abnormality in the motor generator MG (step S402). If it is determined that there is the abnormality in the motor generator MG (the step S402: YES), the subsequent process is not performed.

If it is determined that there is no abnormality in the motor generator MG (the step S402: NO), it is determined on the logical contradiction determination unit 131 whether or not there is a logical contradiction abnormality in the characteristic of the motor generator MG (step S403).

If it is determined that there is no logical contradiction abnormality (the step S403: NO), the motor generator MG is controlled in the normal mode (step S404). In other words, the fail-safe process by the fail-safe control unit 140 is not performed. On the other hand, if it is determined that there is the logical contradiction abnormality (the step S403: YES), the motor generator MG is controlled in various fail-safe modes described later. In other words, the fail-safe process according to the characteristic is performed by the fail-safe control unit 140.

If it is determined that there is the logical contradiction abnormality (the step S403: YES), it is determined whether or not the occurring logical contradiction abnormality is the logical contradiction A→B (step S405). In particular, if the occurring logical contradiction abnormality is the logical contradiction A→B (the step S405: YES), a demand is given to switch the actually realized characteristic B to the characteristic A stored in the characteristic storage unit (or the characteristic to be realized) (step S406). After the characteristic switching control according to the switching demand, it is determined whether or not the characteristic switching control is normally completed (step S407). In other words, it is determined whether or not the characteristic of the motor generator MG after the characteristic switching control is accurately switched to the characteristic A.

Here, if it is determined that the characteristic switching control is normally completed (the step S407: YES), both the actual characteristic and the characteristic stored in the characteristic storage unit are the characteristic A, and it is thus determined that the logical contradiction A→B is solved. Therefore, if the characteristic switching control is normally completed, the motor generator MG is controlled in the normal mode (the step S404).

On the other hand, if it is determined that the characteristic switching control is not normally completed (the step S407: NO), the actual characteristic remains B, and it is thus determined that the logical contradiction A→B remains unsolved. Therefore, if the characteristic switching control is not normally completed, as in the aforementioned first embodiment, the process for moving to the fail-safe mode is performed. Specifically, it is firstly determined whether or not the engine 200 is started (step S408). If it is determined that the engine 200 is started (the step S408: YES), the motor generator MG is controlled in the fail-safe mode 5 (step S409).

If it is determined that the engine 200 is not started (the step S408: NO), it is further determined whether or not the shift or transmission of the vehicle is set to the driving range (step S410). Here, if it is determined that the shift of the vehicle is set to the driving range (the step S410: YES), the motor generator MG is controlled in the fail-safe mode 6 (step S411).

On the other hand, if it is determined that the shift of the vehicle is set to a range other than the driving range (the step S410: NO), a process for starting the engine 200 is performed (step S412). After the start control of the engine 200, it is determined whether or not the engine is normally started (step S413). If the engine 200 is normally started (the step S413: YES), the motor generator MG is controlled in the aforementioned fail-safe mode 5 (the step S409). On the other hand, if the engine 200 is not normally started (the step S413: NO), the motor generator MG is controlled in the aforementioned fail-safe mode 6 (the step S411).

If the occurring logical contradiction abnormality is not the logical contradiction A→B (the step S405: NO), a demand is given to switch the actually realized characteristic A or characteristic X to the characteristic B stored in the characteristic storage unit (step S414). After the characteristic switching control according to the switching demand, it is determined whether or not the characteristic switching control is normally completed (step S415). In other words, it is determined whether or not the characteristic of the motor generator MG after the characteristic switching control is accurately switched to the characteristic B.

If it is determined that the characteristic switching control is normally completed (the step S415: YES), both the actual characteristic and the characteristic stored in the characteristic storage unit are the characteristic B, and it is thus determined that the logical contradiction B→A is solved. Therefore, if the characteristic switching control is normally completed, the motor generator MG is controlled in the normal mode (the step S404).

On the other hand, if it is determined that the characteristic switching control is not normally completed (the step S415: NO), the actual characteristic remains A or X, and it is thus determined that the logical contradiction B→A remains unsolved. Therefore, if the characteristic switching control is not normally completed, as in the aforementioned first embodiment, the process for moving to the fail-safe mode is performed. Specifically, it is firstly determined whether or not the occurring logical contradiction abnormality is the logical contradiction B→A (step S416). If it is determined that the occurring logical contradiction abnormality is the logical contradiction B→A (the step S416: YES), the motor generator MG is controlled in the fail-safe mode 7 (step S417).

On the other hand, if it is determined that the occurring logical contradiction abnormality is not the logical contradiction B→A (the step S416: NO), the motor generator MG is controlled in the fail-safe mode 8 (step S418).

As described above, in the control apparatus for the vehicle motor according to the second embodiment, if there is the logical contradiction abnormality in the characteristic of the motor generator MG, a restoring process for solving the logical contradiction abnormality is performed. Therefore, if the abnormality in the characteristic switching control is not the unswitchability, the drive in the normal mode can be continued without moving to the fail-safe mode.

<Third Embodiment>

Figure 16:
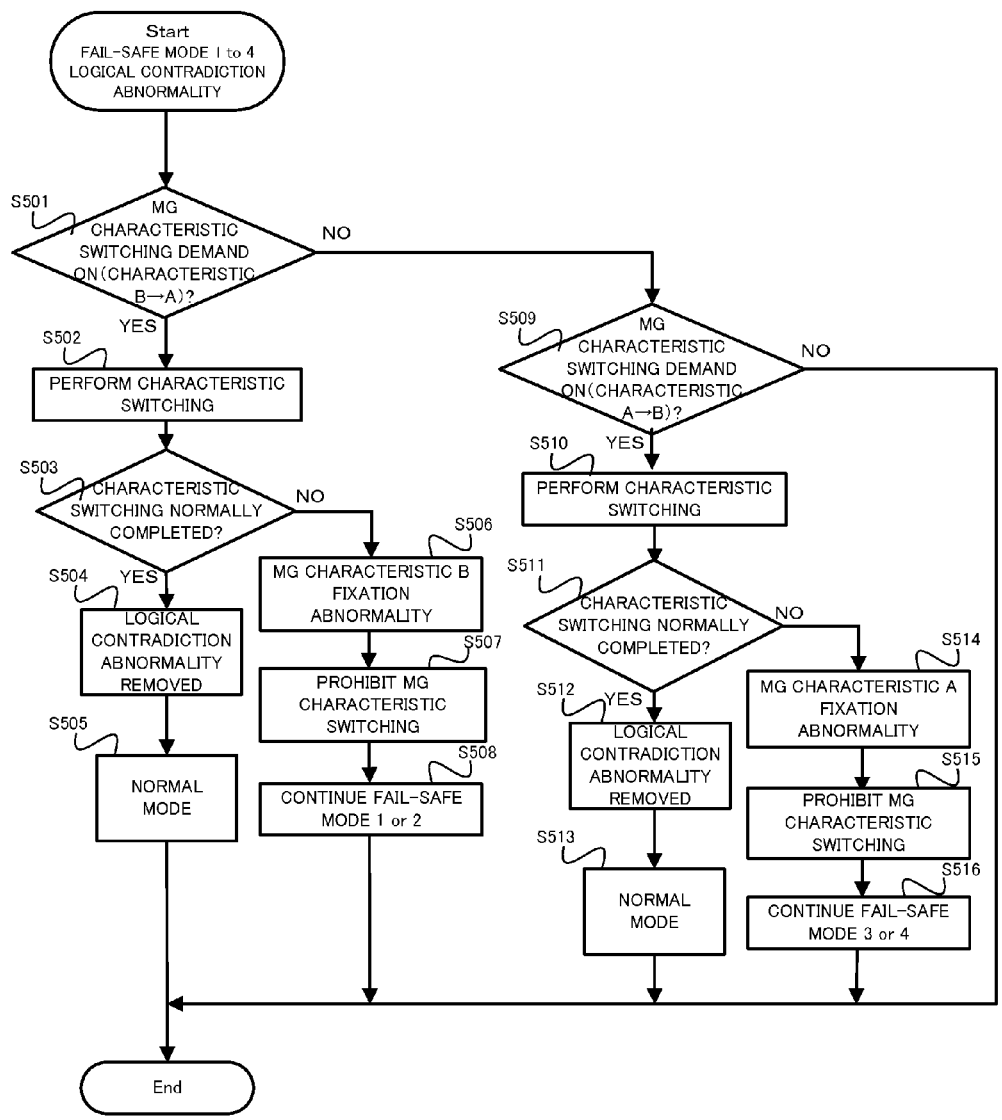
FIG. 16 is a flowchart illustrating the operation of the control apparatus for the vehicle motor according to a third embodiment.

Next, the operation of the control apparatus for the vehicle motor according to a third embodiment will be explained with reference to FIG. 16. FIG. 16 is a flowchart illustrating the operation of the control apparatus for the vehicle motor according to the third embodiment.

The third embodiment is different from the aforementioned first and second embodiments only in partial operation, and is substantially the same in another part. Thus, hereinafter, the different part from the first and second embodiments will be explained in detail, and an explanation of the same part will be omitted.

The process illustrated in FIG. 16 is a process after it is determined that there is the logical contradiction abnormality and the drive of the motor generator MG moves to the fail-safe modes 1 to 4 in the aforementioned first embodiment. In operation of the control apparatus for the vehicle motor according to the third embodiment, if the characteristic switching demand is given during the fail-safe mode, it is determined whether or not the characteristic switching demand is to switch the characteristic B to the characteristic A (step S501). If the characteristic switching demand is to switch the characteristic B to the characteristic A (the step S501: YES), the characteristic switching control according to the characteristic switching demand is performed (step S502).

After the characteristic switching control according to the characteristic switching demand, it is determined whether or not the characteristic switching control is normally completed (step S503). In other words, it is determined whether or not the characteristic of the motor generator MG after the characteristic switching control is accurately switched from the characteristic B to the characteristic A.

If it is determined that the characteristic switching control is normally completed (the step S503: YES), both the actual characteristic and the characteristic stored in the characteristic storage unit are the characteristic A, and it is thus determined that the logical contradiction abnormality is solved (step S504). Therefore, if the characteristic switching control is normally completed, the motor generator MG is controlled in the normal mode (step S505).

On the other hand, if it is determined that the characteristic switching control is not normally completed (the step S503: NO), it is determined that the logical contradiction abnormality remains unsolved. Since the normal characteristic switching control cannot be performed, it is also determined that the characteristic of the motor generator MG is unswitchable and that there is the fixation abnormality to the characteristic B (step S506). Thus, in order to suppress power consumption, the subsequent characteristic switching control is prohibited (step S507). Moreover, the control of the motor generator MG in the fail-safe mode 1 or 2 is continued (step S508).

On the other hand, if the characteristic switching demand is not to switch the characteristic B to the characteristic A (the step S501: NO), it is determined whether or not the characteristic switching demand is to switch the characteristic A to the characteristic B (step S509). If it is determined that the characteristic switching demand is not to switch the characteristic A to the characteristic B (the step S509: NO), the subsequent process is omitted.

If it is determined that the characteristic switching demand is to switch the characteristic A to the characteristic B (the step S509: YES), the characteristic switching control according to the characteristic switching demand is performed (step S510). After the characteristic switching control according to the characteristic switching demand, it is determined whether or not the characteristic switching control is normally completed (step S511). In other words, it is determined whether or not the characteristic of the motor generator MG after the characteristic switching control is accurately switched from the characteristic A to the characteristic B.

Here, if it is determined that the characteristic switching control is normally completed (the step S511: YES), both the actual characteristic and the characteristic stored in the characteristic storage unit are the characteristic B, and it is thus determined that the logical contradiction abnormality is solved (step S512). Therefore, if the characteristic switching control is normally completed, the motor generator MG is controlled in the normal mode (step S513).

On the other hand, if it is determined that the characteristic switching control is not normally completed (the step S511: NO), it is determined that the logical contradiction abnormality remains unsolved. Since the normal characteristic switching control cannot be performed, it is also determined that the characteristic of the motor generator MG is unswitchable and that there is the fixation abnormality to the characteristic A (step S514). Thus, in order to suppress power consumption, the subsequent characteristic switching control is prohibited (step S515). Moreover, the control of the motor generator MG in the fail-safe mode 3 or 4 is continued (step S516).

As described above, in the control apparatus for the vehicle motor according to the third embodiment, if there is the logical contradiction abnormality in the characteristic of the motor generator MG, the restoring process for solving the logical contradiction abnormality is performed as a process during the fail-safe mode. Therefore, if the abnormality in the characteristic switching control is not the unswitchability, the motor generator MG can be driven after the transition from the fail-safe mode to the normal mode.

<Fourth Embodiment>

Next, the operation of the control apparatus for the vehicle motor according to a fourth embodiment will be explained with reference to FIG. 17 to FIG. 21.

The fourth embodiment is different from the aforementioned first to third embodiments only in partial operation, and is substantially the same in another part. Thus, hereinafter, the different part from the first to third embodiments will be explained in detail, and an explanation of the same part will be omitted.

Figure 17:
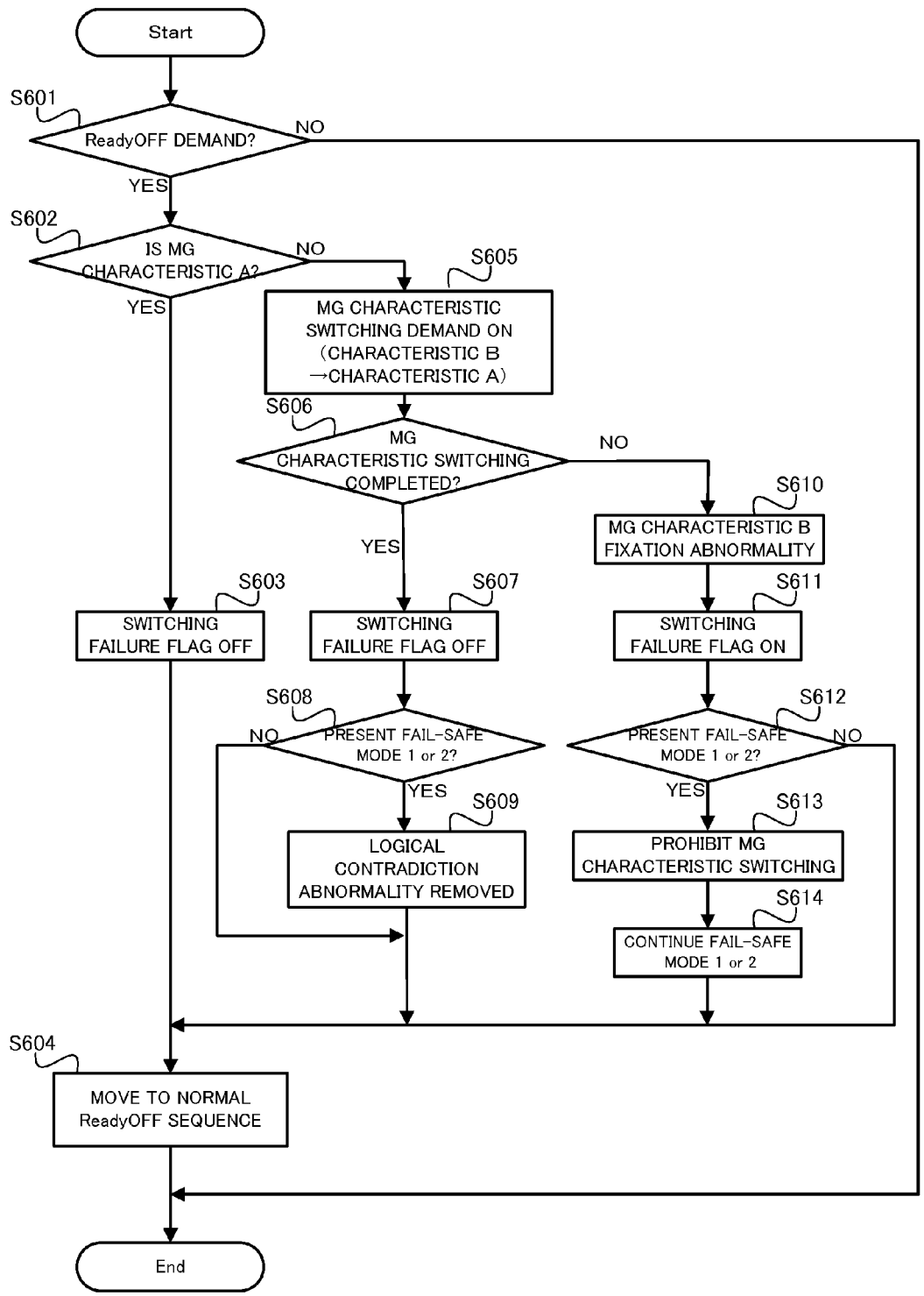
FIG. 17 is a flowchart illustrating the operation of the control apparatus for the vehicle motor according to a fourth embodiment upon stop of a vehicle.

Firstly, the operation of the control apparatus for the vehicle motor according to a fourth embodiment upon stop of the vehicle will be explained with reference to FIG. 17. FIG. 17 is a flowchart illustrating the operation of the control apparatus for the vehicle motor according to the fourth embodiment upon stop of the vehicle.

In FIG. 17, in operation of the control apparatus for the vehicle motor according to the fourth embodiment, upon stop of the hybrid vehicle 1, the characteristic of the motor generator MG is switched to the characteristic A. In other words, such control that the hybrid vehicle 1 is not stopped with the characteristic B is performed.

Specifically, it is firstly determined whether or not a system off command is given to the hybrid vehicle 1 (step S601). If it is determined that the system off command is given to the hybrid vehicle 1 (the step S601: YES), it is determined whether or not the characteristic of the motor generator MG is the characteristic A (step S602).

Figure 18:
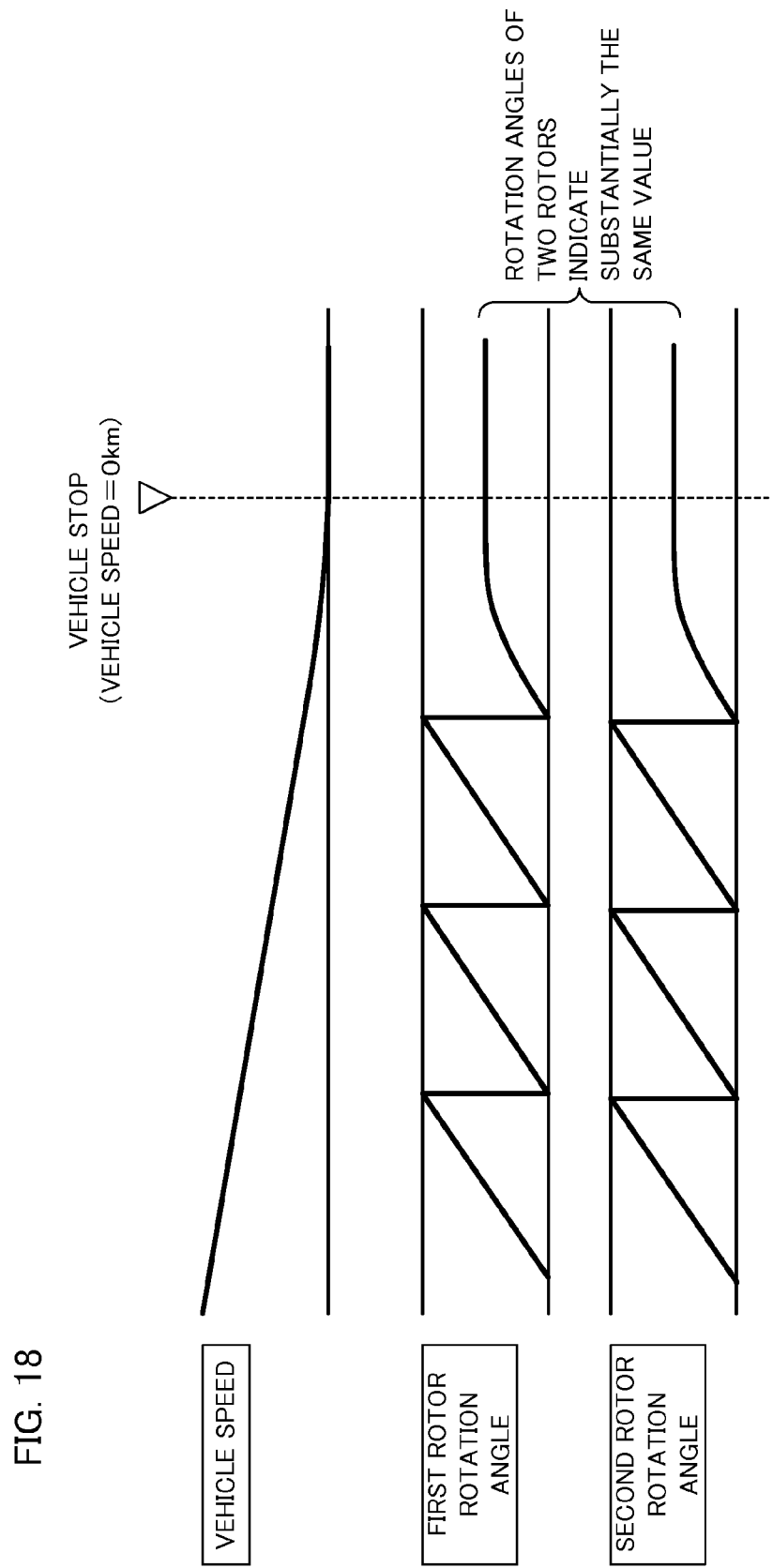
FIG. 18 is a time chart illustrating the operation upon stop of a vehicle on which the motor generator having the characteristic A is mounted.
Figure 19:
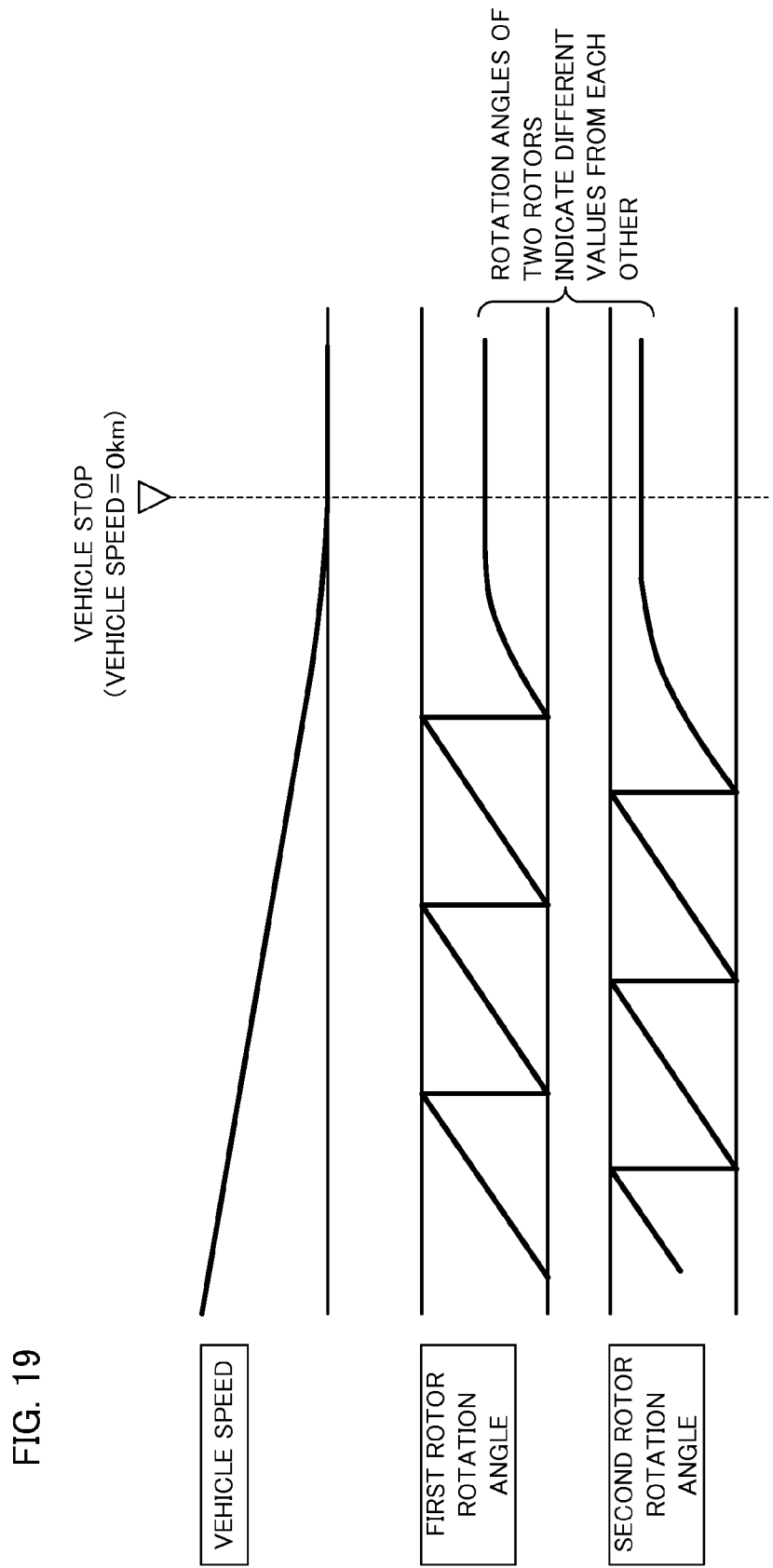
FIG. 19 is a time chart illustrating the operation upon stop of a vehicle on which the motor generator having the characteristic B is mounted.

Hereinafter, a method of determining the characteristic of the motor generator MG upon the stop of the vehicle will be more specifically explained with reference to FIG. 18 and FIG. 19. FIG. 18 is a time chart illustrating the operation upon stop of the vehicle on which the motor generator having the characteristic A is mounted. FIG. 19 is a time chart illustrating the operation upon stop of a vehicle on which the motor generator having the characteristic B is mounted.

In FIG. 18, if the characteristic of the motor generator MG immediately before the stop is the characteristic A, the rotation angles of the first rotor 610 and the second rotor 620 during running of the hybrid vehicle 1 change to have the same phase with the same period. Thus, even if the hybrid vehicle 1 is stopped, the rotation angles of the first rotor 610 and the second rotor 620 change in the same manner and are stopped at substantially the same value. Therefore, if the first rotor 610 and the second rotor 620 have the same rotation angle after the stop of the hybrid vehicle 1, it can be determined that the characteristic of the motor generator MG is the characteristic A.

In FIG. 19, if the characteristic of the motor generator MG immediately before the stop is the characteristic B, the rotation angles of the first rotor 610 and the second rotor 620 during running of the hybrid vehicle 1 change with the same phase but change to have relatively different phases. Thus, even if the hybrid vehicle 1 is stopped, the rotation angles of the first rotor 610 and the second rotor 620 change with different values and are stopped at different values. Therefore, if the first rotor 610 and the second rotor 620 have different rotation angles after the stop of the hybrid vehicle 1, it can be determined that the characteristic of the motor generator MG is the characteristic B.

Moreover, in the determination upon stop of the vehicle, the characteristic may not be determined directly from the rotation angles of the rotors as described above, but can be determined on the basis of the situation of the motor generator immediately before the stop. For example, the motor generator MG outputs stop torque to stop the vehicle in some cases, and the stop torque is required to be relatively high torque due to the nature thereof. Thus, the motor generator MG that outputs the stop torque is considered to have the characteristic A that allows the output of the relatively high torque. Therefore, if the motor generator MG outputs the stop torque to stop the vehicle, it can be determined that the characteristic of the motor generator MG is the characteristic A without detecting the rotation angles of the rotors described above or the like. In other words, without separately performing a process for determining the characteristic of the motor generator MG, the characteristic can be determined by whether or not the motor generator MG outputs the stop torque.

Back in FIG. 17, if it is determined that the characteristic of the motor generator MG is the characteristic A (the step S602: YES), a switching failure flag indicating a failure of the characteristic switching control is set to OFF (step S603). Since the characteristic switching control is not newly performed, whether or not the characteristic switching control is actually normally completed is not certain, but the switching failure flag is set to OFF in such a sense that at least there is no failure (step S604).

On the other hand, if it is determined that the characteristic of the motor generator MG is not the characteristic A (the step S602: NO), an instruction is given to the MG characteristic switching control unit 120 to switch the characteristic of the motor generator MG to the characteristic A. By this, the control that the phases of the first rotor 610 and the second rotor 620 are relatively matched is performed (step S605).

After the characteristic switching control, it is determined whether or not the characteristic switching control is normally completed (step S606). Specifically, it is determined whether or not the characteristic of the motor generator MG is certainly set to the characteristic A. If it is determined that the characteristic switching control is normally completed (the step S606: YES), the switching failure flag indicating the failure of the characteristic switching control is set to OFF (step S607).

Then, it is determined whether or not the present mode is either the fail-safe mode 1 or 2 (i.e. whether or not the present mode is set to the fail-safe mode corresponding to the logical contradiction A→B) (step S608). Particularly if it is determined that the present mode is either the fail-safe mode 1 or 2 (the step S608: YES), both the characteristic stored in the characteristic storage unit and the actual characteristic are the characteristic A due to the aforementioned process, and thus, the logical contradiction abnormality is removed (step S609). If it is determined that the present mode is neither the fail-safe mode 1 nor 2 (the step S608: NO), the aforementioned step S609 is omitted.

Regardless of the implementation of the characteristic switching control, if it is determined that the characteristic switching control is not normally completed (the step S606: NO), it is determined that the characteristic of the motor generator MG is fixed to the characteristic B (step S610).

After it is determined that the characteristic is fixed to the characteristic B, the switching failure flag is set to OFF (step S611). Then, it is determined whether or not the present mode is either the fail-safe mode 1 or 2 (i.e. whether or not the present mode is set to the fail-safe mode corresponding to the logical contradiction A→B) (step S612).

Particularly if it is determined that the present mode is either the fail-safe mode 1 or 2 (the step S612: YES), in order to suppress power consumption, the characteristic switching control of the motor generator MG is prohibited (step S613). Moreover, since the logical contradiction abnormality is not solved, the fail-safe mode 1 or 2 is continued (step S614). If it is determined that the present mode is neither the fail-safe mode 1 nor 2 (the step S612: NO), the aforementioned steps S613 and S614 are omitted.

Figure 20:
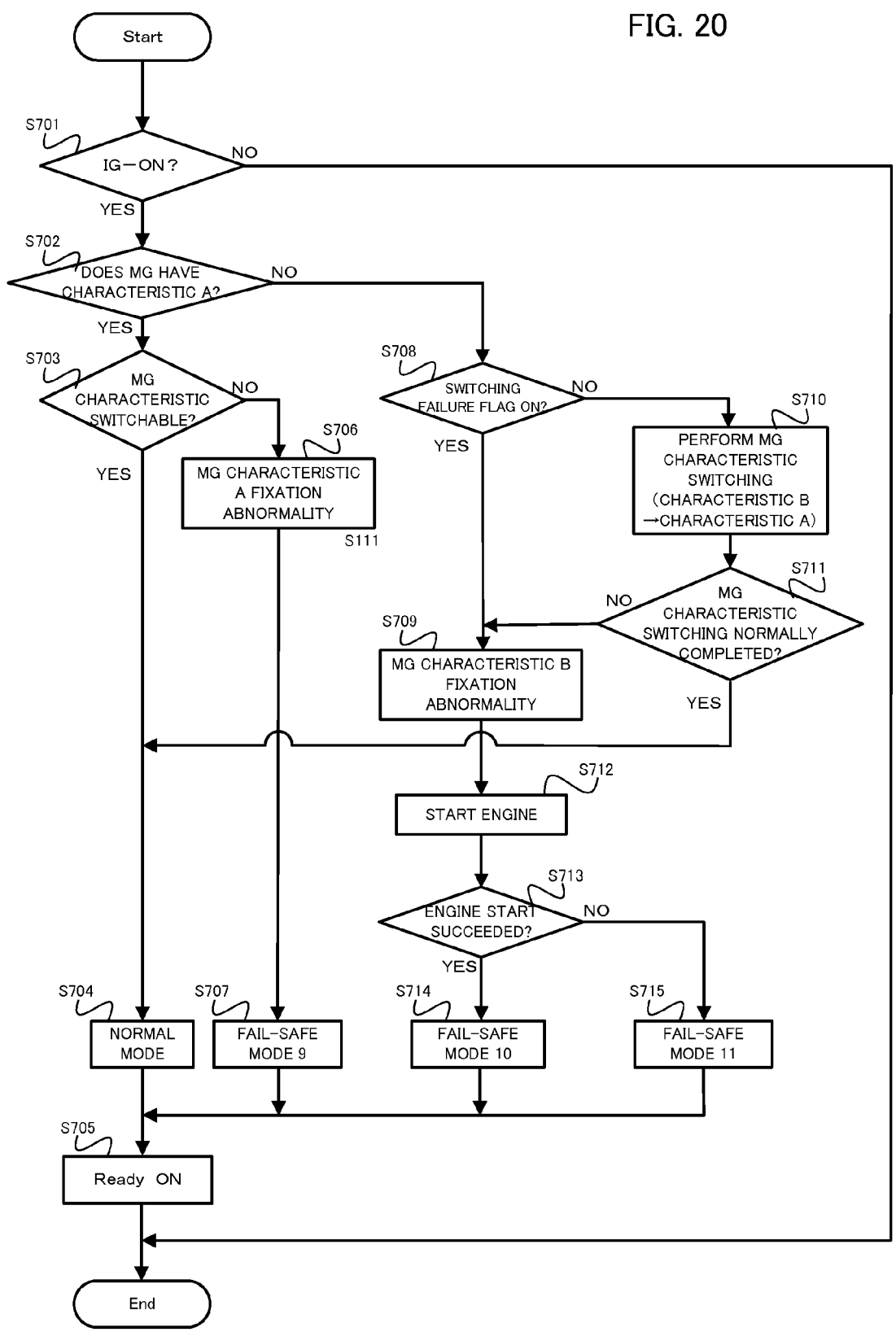
FIG. 20 is a flowchart illustrating the operation of the control apparatus for the vehicle motor according to the fourth embodiment at the start of the vehicle.

Next, the operation of the control apparatus for the vehicle motor according to the fourth embodiment at the start of the vehicle will be explained with reference to FIG. 20. FIG. 20 is a flowchart illustrating the operation of the control apparatus for the vehicle motor according to the fourth embodiment at the start of the vehicle.

The process illustrated in FIG. 17 is a process after the characteristic of the motor generator MG is controlled to be the characteristic A upon stop of the vehicle, as described above. In operation of the control apparatus for the vehicle motor according to the fourth embodiment, if ignition is ON at the start of the hybrid vehicle 1 (step S701), it is determined whether or not the characteristic of the motor generator MG is the characteristic A (step S702).

Figure 21:
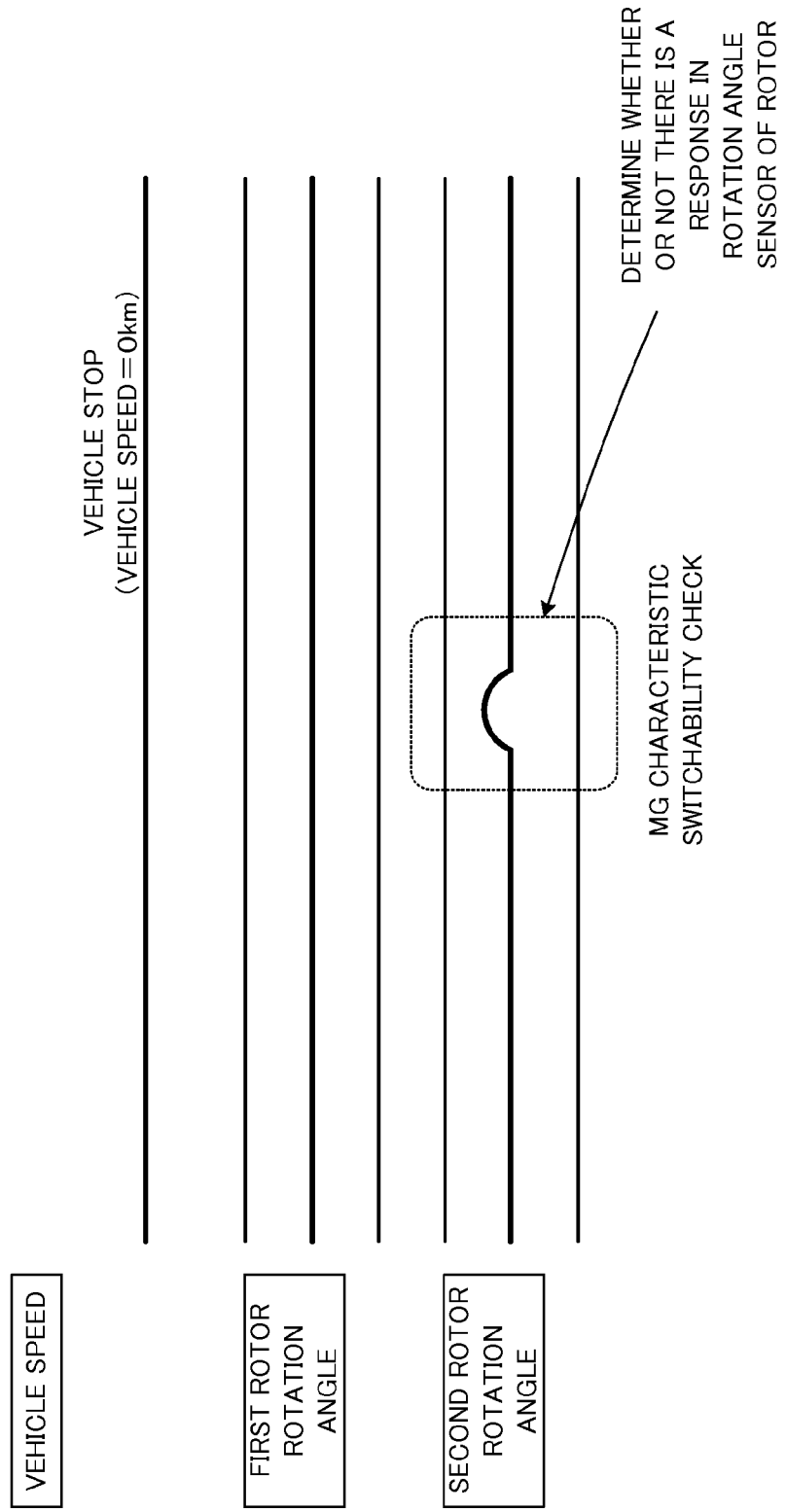
FIG. 21 is a time chart illustrating an operation of checking switchability of the motor generator characteristic.

If it is determined that the characteristic of the motor generator MG is the characteristic A (the step S702: YES), a characteristic switchability check is performed (step S703). Hereinafter, a specific method of the characteristic switchability check will be explained with reference to FIG. 21. FIG. 21 is a time chart illustrating an operation of checking switchability of the characteristic of the motor generator MG.

In FIG. 21, in the characteristic switchability check, the rotation angle of the second rotor 620 of the motor generator MG is controlled to slightly vary only by one degree. Here, as illustrated in FIG. 21, if there is a response in the rotation angle of the second rotor 620, it is found out that the rotation angle of the second rotor 620 can be changed. It can be thus determined that the characteristic switching control can be performed as well. On the other hand, if there is no response in the rotation angle of the second rotor 620, the rotation angle of the second rotor 620 cannot be changed. It can be thus determined that the characteristic switching control cannot be performed either.

Such a characteristic switchability check may be performed by controlling the rotation angle of the first rotor 610, or by controlling both the rotation angles of the first rotor 610 and the second rotor 620. Moreover, a plurality of times of implementation can increase accuracy.

Back in FIG. 20, as a result of the characteristic switchability check, if it is determined that the characteristic switchability check can be performed (the step S703: YES), the motor generator MG is controlled in the normal mode (step S704).

On the other hand, as a result of the characteristic switchability check, if it is determined that the characteristic switchability check cannot be performed (the step S703: NO), it is determined that the characteristic of the motor generator MG is fixed to the characteristic A (step S706). In this case, the motor generator MG is controlled in a fail-safe mode 9 (step S707). The fail-safe mode 9 is a fail-safe mode corresponding to a case where there is the characteristic A fixation abnormality, as in the aforementioned fail-safe mode 7. For example, the process for preventing the overcharge of the battery 12, the process for prohibiting the characteristic switching control, or the like is performed.

On the other hand, if it is determined that the characteristic of the motor generator MG is not the characteristic A (the step S702: NO), the characteristic switching possibly fails upon stop of the vehicle, and it is thus determined whether or not the switching failure flag is set to ON (step S708). If the switching failure flag is set to ON (the step S708: YES), it is determined that the characteristic of the motor generator MG is fixed to the characteristic B (step S709). If the switching failure flag is used in this manner, the occurrence of the characteristic fixation abnormality can be determined without newly performing the characteristic switching control.

If it is determined that the switching failure flag is not set to ON (the step S708: NO), it is considered that regardless of the normal implementation of the characteristic switching control upon stop of the vehicle, there is some abnormality between the stop and the start, and that the characteristic A is changed to the characteristic B. Thus, if it is determined that the switching failure flag is not set to ON, the characteristic switching control is performed to switch the characteristic B to the characteristic A (step S710). Here, if the characteristic switching control is normally completed (step S711: YES), the abnormality in the characteristic switching control is considered to be solved. Thus, the motor generator MG is controlled in the normal mode (step S704). On the other hand, if the characteristic switching control is not normally completed (the step S711: NO), it is determined that the characteristic of the motor generator MG is fixed to the characteristic B (step S709).

If it is determined that there is the characteristic B fixation abnormality, it is then determined whether or not the engine 200 is started (step S713). Here, if it is determined that the engine 200 is started (the step S713: YES), the motor generator MG is controlled in a fail-safe mode 10 (step S714).

The fail-safe mode 10 is a fail-safe mode corresponding to a case where there is the characteristic B fixation abnormality and the engine is started, as in the aforementioned fail-safe mode 5. For example, the process for responding to the insufficient driving force caused by the fixation of the characteristic to B, the process for prohibiting the characteristic switching control, or the like is performed.

On the other hand, if it is determined that the engine 200 is not started (the step S713: NO), the motor generator MG is controlled in a fail-safe mode 11 (step S715).

The fail-safe mode 11 is a fail-safe mode corresponding to a case where there is the characteristic B fixation abnormality and the engine 200 is not started, as in the aforementioned fail-safe mode 6. For example, the process for responding to the insufficient driving force caused by the fixation of the characteristic to B, the fail-safe process for responding to the insufficient driving force caused by that the engine 200 is not started, the process for prohibiting the characteristic switching control, or the like is performed.

As explained above, according to the control apparatus for the vehicle motor according to the fourth embodiment, the characteristic of the motor generator MG is set to the characteristic A upon stop of the vehicle. It is thus possible to prevent that the vehicle cannot preferably run due to the occurrence of the characteristic fixation abnormality during the stop. Moreover, in the characteristic switching control upon the stop, it can be determined whether or not the characteristic is normally switched. Therefore, the transition to the fail-safe mode can be more efficiently realized.

The characteristic of the motor generator MG according to the fourth embodiment is required to be maintained in the system off state as described above. Thus, the motor generator MG according to the fourth embodiment is preferably configured not to require electric power to maintain the characteristic. As a specific example in which electric power is not required to maintain the characteristic, a rotor of a rotor division type, a rotor of a variable magnetic force type due to electric current control, or the like is exemplified.

More specifically, in the rotor division type, for example, if the characteristic A is realized, N-N poles match with each other and S-S poles match with each other between the divided rotors. Thus, respective repulsive forces of the poles balance with each other, and the rotors do not move. If, however, the characteristic B is realized, N-S poles match with each other and S-N poles match with each other between the divided rotors. Thus, the poles are attached to each other due to respective magnetic forces, and the rotors do not move. As a result, in the rotor division type, the characteristic is maintained even if the system off is set and electrification or energization is not carried out.

On the other hand, in the variable magnetic force type, a variable magnet (e.g. a samarium cobalt magnet, an alnico magnet, etc.) in which magnetic force is changed by the electric current control is used for magnetic force varying control. Once current is supplied and a magnetic field is generated, latest magnetic force is maintained unless current is supplied to change the magnetic field again. Thus, in the variable magnetic force type, the characteristic is maintained even if the system off is set and electrification or energization is not carried out.

<Fifth Embodiment>

Figure 22:
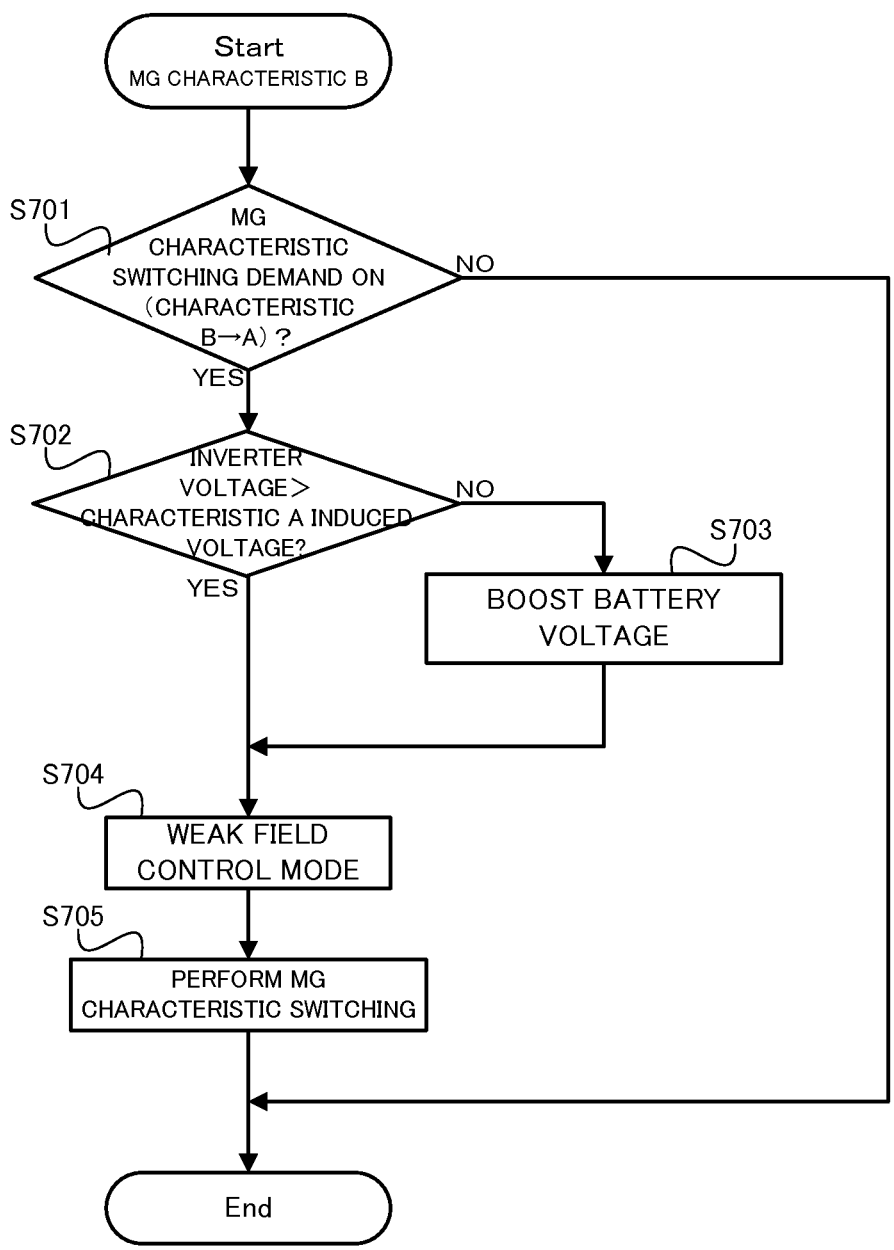
FIG. 22 is a flowchart illustrating battery voltage boost control in the characteristic switching control.

Next, the operation of the control apparatus for the vehicle motor according to a fifth embodiment will be explained with reference to FIG. 22. FIG. 22 is a flowchart illustrating battery voltage boost control in the characteristic switching control.

The fifth embodiment is different from the aforementioned first to fourth embodiments only in partial operation, and is substantially the same in another part. Thus, hereinafter, the different part from the first to fourth embodiments will be explained in detail, and an explanation of the same part will be omitted.

The process illustrated in FIG. 22 is started in a state in which the motor generator MG is controlled in the normal mode and is set to have the characteristic B. In operation of the control apparatus for the vehicle motor according to the fifth embodiment, if a switching demand is given to switch the characteristic of the motor generator MG from the characteristic B to the characteristic A (step S701: YES), it is determined whether or not the voltage of an inverter (not illustrated) is greater than induced voltage when the motor generator MG has the characteristic A (step S702). In other words, even if the characteristic switching demand is given, the characteristic switching control is not started soon. The induced voltage of the characteristic A can be calculated by using the present number of revolutions of the motor generator MG and the back electromotive force constant of the characteristic A.

In particular, if it is determined that the inverter voltage is less than or equal to the induced voltage of the characteristic A (the step S702: NO), the inverter voltage is boosted to be greater than the induced voltage of the characteristic A. In other words, the voltage of the battery 12 is boosted to be greater than the induced voltage (step S703). Such a configuration makes it possible to prevent that the battery is overcharged due to the increase in the induced voltage, during the switching control to the characteristic A. If it is determined that the inverter voltage is greater than the induced voltage of the characteristic A (the step S702: YES), the aforementioned boost control is omitted.

Then, the motor generator MG is moved to the weak field control mode. This can prevent a decrease in output torque of the motor generator MG during the switching control to the characteristic A. It is thus possible to suppress the deterioration of vibration and occurrence of a shock caused by a driving force change, or the like.

The characteristic switching control according to the characteristic switching demand is performed after the end of the aforementioned process (i.e. the transition to the boost control and the weak field control mode).

As explained above, according to the control apparatus for the vehicle motor according to the fifth embodiment, if the switching from the characteristic B to the characteristic A is performed during the control in the normal mode, it is possible to reduce a disadvantage that can occur during the characteristic switching control.

The present invention is not limited to the aforementioned embodiments, but various changes may be made, if desired, without departing from the essence or spirit of the invention which can be read from the claims and the entire specification. A control apparatus for a vehicle motor which involves such changes is also intended to be within the technical scope of the present invention.

DESCRIPTION OF REFERENCE NUMERALS AND LETTERS 1 hybrid vehicle
10 hybrid drive apparatus
11 PCU
12 battery
13 accelerator opening sensor
14 vehicle speed sensor
100 ECU
110 MG characteristic switching determination unit
120 MG characteristic switching control unit
130 MG characteristic switching abnormality determination unit
140 fail-safe control unit
200 engine
310 MG1-side power transmission mechanism
320 MG2-side power transmission mechanism
410 damper
420 input shaft
500 drive shaft
610 first rotor
615 first rotor cavity
620 second rotor
625 second rotor cavity
MG1, MG2 motor generator

The invention claimed is:

1. A control apparatus for a vehicle motor, configured to control a motor that can realize a plurality of characteristics in which output upper limits of torque are different from each other, said control apparatus for the vehicle motor comprising:
a characteristic switching device configured to switch a characteristic of the motor between a first characteristic in which the output upper limit is first predetermined torque and a second characteristic in which the output upper limit is second predetermined torque, which is lower than the first predetermined torque;
a characteristic switching abnormality determining device configured to determine whether or not there is an abnormality in switching of the characteristic of the motor; and
a fail-safe performing device configured to perform a fail-safe process according to the characteristic of the motor if it is determined that there is the abnormality in the switching of the characteristic of the motor, wherein
said characteristic switching abnormality determining device comprises (i) a logical contradiction determining device configured to determine that there is a logical contradiction in the characteristic of the motor if a characteristic to which it is to be switched by the switching of the characteristic of the motor performed immediately before and a present characteristic of the motor are different from each other and (ii) an unswitchability determining device configured to determine that the characteristic of the motor is unswitchable if the switching of the characteristic of the motor cannot be performed, and said fail-safe mode performing device sets switching frequency of the characteristic of the motor by said characteristic switching device after it is determined that there is the logical abnormality, to be higher than switching frequency of the characteristic of the motor by said characteristic switching device after it is determined that the characteristic is unswitchable.

2. The control apparatus for the vehicle motor according to claim 1, wherein the motor is configured to control a number of revolutions of an internal combustion engine of a vehicle on which the motor is mounted, and said fail-safe performing device can perform required driving force restriction on the motor as the fail-safe process if the characteristic of the motor when it is determined that there is the abnormality is the second characteristic, and in the required driving force restriction, a required driving force is restricted to have a lower upper limit during stop of the internal combustion engine than during driving of the internal combustion engine.

3. The control apparatus for the vehicle motor according to claim 2, wherein said fail-safe performing device prohibits intermittent stop of the internal combustion engine as the fail-safe process if the characteristic of the motor when it is determined that there is the abnormality is the second characteristic and if the internal combustion engine is being driven.

4. The control apparatus for the vehicle motor according to claim 1, wherein said fail-safe performing device can output a demand to switch the characteristic of the motor a plurality of times, as the fail-safe process, and the demand to switch the characteristic of the motor is more frequently outputted after a start of a vehicle on which the motor is mounted, than at the start of the vehicle.

5. The control apparatus for the vehicle motor according to claim 1, wherein said fail-safe performing device performs boost control in which voltage of a power storing device in which electric power regenerated by the motor is stored is boosted to a predetermined first target voltage value, as the fail-safe process, if the characteristic of the motor when it is determined that there is the abnormality is the first characteristic and after a vehicle on which the motor is mounted is started.

6. The control apparatus for the vehicle motor according to claim 1, wherein said fail-safe performing device performs boost control in which voltage of a power storing device in which electric power regenerated by the motor is stored is boosted to a predetermined second target voltage value, before the switching, if it is determined there is no abnormality and if the characteristic of the motor is switched from the second characteristic to the first characteristic.

7. The control apparatus for the vehicle motor according to claim 1, wherein said control apparatus for the vehicle motor comprises:

a characteristic controlling device configured to control said characteristic switching device to switch the characteristic of the motor to the first characteristic if a vehicle on which the motor is mounted is stopped; and a flagging device configured to set a flag indicating a failure of the switching of the characteristic of the motor if the characteristic of the motor is not switched to the first characteristic according to the control by said characteristic controlling device, and said characteristic switching abnormality determining device determines that there is the abnormality in the switching of the characteristic of the motor if the flag is set at a restart of the vehicle.

* * * * *